United States Patent
Meunier et al.

(10) Patent No.: US 9,779,284 B2
(45) Date of Patent: Oct. 3, 2017

(54) PRIVACY-PRESERVING EVIDENCE IN ALPR APPLICATIONS

(71) Applicant: Conduent Business Services, LLC, Dallas, TX (US)

(72) Inventors: Jean-Luc Meunier, St. Nazaire les Eymes (FR); Saghar Estehghari, La Tronche (FR); Herve Poirier, Meylan (FR)

(73) Assignee: Conduent Business Services, LLC, Dallas, TX (US)

( * ) Notice: Subject to any disclaimer, the term of this patent is extended or adjusted under 35 U.S.C. 154(b) by 393 days.

(21) Appl. No.: 14/108,477

(22) Filed: Dec. 17, 2013

(65) Prior Publication Data
US 2015/0172056 A1    Jun. 18, 2015

(51) Int. Cl.
| | | |
|---|---|---|
| H04L 29/06 | (2006.01) | |
| G06K 9/00 | (2006.01) | |
| G08G 1/017 | (2006.01) | |
| G08G 1/04 | (2006.01) | |
| H04L 9/08 | (2006.01) | |
| H04L 9/32 | (2006.01) | |
| G08G 1/054 | (2006.01) | |

(52) U.S. Cl.
CPC ..... G06K 9/00161 (2013.01); G06K 9/00577 (2013.01); G08G 1/0175 (2013.01); G08G 1/04 (2013.01); H04L 9/0866 (2013.01); H04L 9/0872 (2013.01); H04L 9/3247 (2013.01); G06K 2009/0059 (2013.01); G08G 1/054 (2013.01)

(58) Field of Classification Search
USPC .......................................................... 380/28
See application file for complete search history.

(56) References Cited

U.S. PATENT DOCUMENTS

| | | | |
|---|---|---|---|
| 4,433,325 | A | 2/1984 | Tanaka et al. |
| 5,083,200 | A | 1/1992 | Deffontaines |
| 5,592,567 | A | 1/1997 | Kilger |

(Continued)

OTHER PUBLICATIONS

U.S. Appl. No. 14/054,998, filed Oct. 16, 2013. Rodriguez-Serrano, et al.

(Continued)

*Primary Examiner* — Harris C Wang
(74) *Attorney, Agent, or Firm* — Fay Sharpe LLP

(57) ABSTRACT

A system and method for preserving privacy of evidence are provided. In the method, an encrypted first image is generated by encrypting a first image acquired at a first location with a symmetric cryptographic key that is based on first information such as a license plate number extracted from the first image and first metadata associated with the first image, such as a time at which the first image was acquired. When a link is established between a second image and the first image, for example, through visual signature matching, the symmetric cryptographic key can be reconstructed, without having access to the first image, but based instead on the first metadata and information extracted from the second image. The reconstructed symmetric cryptographic key can then be used for decryption of the encrypted image to establish evidence that the license plate number was indeed extracted from the first image.

17 Claims, 13 Drawing Sheets

(56) References Cited

U.S. PATENT DOCUMENTS

| | | | |
|---|---|---|---|
| 5,801,856 A * | 9/1998 | Moghadam | G03C 11/02 355/39 |
| 5,809,161 A | 9/1998 | Auty et al. | |
| 5,995,900 A | 11/1999 | Hsiao et al. | |
| 6,198,833 B1 * | 3/2001 | Rangan | G06K 9/32 382/103 |
| 6,747,687 B1 * | 6/2004 | Alves | H04N 7/188 340/932.2 |
| 6,763,148 B1 * | 7/2004 | Sternberg | G06F 17/30247 382/293 |
| 6,934,392 B1 * | 8/2005 | Vanstone | H04L 9/0844 380/278 |
| 6,996,255 B2 | 2/2006 | Sakuma et al. | |
| 2003/0021481 A1 | 1/2003 | Kasutani | |
| 2006/0056625 A1 * | 3/2006 | Nakabayashi | H04L 9/0662 380/46 |
| 2007/0005356 A1 | 1/2007 | Perronnin | |
| 2007/0258648 A1 | 11/2007 | Perronnin | |
| 2007/0296817 A1 * | 12/2007 | Ebrahimi | G08B 13/19667 348/161 |
| 2008/0069456 A1 | 3/2008 | Perronnin | |
| 2008/0117295 A1 * | 5/2008 | Ebrahimi | G08B 13/19604 348/143 |
| 2008/0240572 A1 | 10/2008 | Hoshii | |
| 2008/0247551 A1 * | 10/2008 | Iwamoto | H04N 1/32133 380/278 |
| 2008/0317358 A1 | 12/2008 | Bressan et al. | |
| 2009/0144033 A1 | 6/2009 | Liu et al. | |
| 2009/0208118 A1 | 8/2009 | Csurka | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0316222 A1 * | 12/2010 | Inami | G06T 1/0021 380/277 |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | Mcauley et al. | |
| 2011/0072012 A1 | 3/2011 | Ah-Pine et al. | |
| 2011/0091105 A1 | 4/2011 | Perronnin | |
| 2011/0137898 A1 | 6/2011 | Gordo et al. | |
| 2011/0184950 A1 | 7/2011 | Skaff et al. | |
| 2012/0045134 A1 | 2/2012 | Perronnin et al. | |
| 2012/0076401 A1 | 3/2012 | Sanchez et al. | |
| 2012/0143853 A1 | 6/2012 | Gordo et al. | |
| 2012/0158739 A1 | 6/2012 | Ah-Pine et al. | |
| 2012/0162432 A1 * | 6/2012 | Abl | G08G 1/054 348/149 |
| 2012/0246477 A1 * | 9/2012 | Hafenscher | G07B 15/063 713/168 |
| 2012/0321127 A1 * | 12/2012 | Dziech | H04N 19/60 382/100 |
| 2013/0060786 A1 | 3/2013 | Serrano et al. | |
| 2013/0129151 A1 | 5/2013 | Rodriguez Serrano et al. | |
| 2013/0129152 A1 | 5/2013 | Rodriguez Serrano et al. | |
| 2013/0182909 A1 | 7/2013 | Rodriguez-Serrano | |
| 2013/0259314 A1 | 10/2013 | Kozitsky et al. | |
| 2013/0266139 A1 * | 10/2013 | Abl | H04L 63/0428 380/255 |
| 2013/0339751 A1 * | 12/2013 | Sun | H04L 9/008 713/189 |
| 2014/0055298 A1 * | 2/2014 | Abl | G08G 1/054 342/52 |

OTHER PUBLICATIONS

U.S. Appl. No. 13/527,228, filed Jun. 19, 2012, Skaff, et al.
U.S. Appl. No. 13/592,961, filed Aug. 23, 2012, Rodriguez-Serrano.
U.S. Appl. No. 13/757,014, filed Feb. 1, 2013, Rodriguez-Serrano, et al.
U.S. Appl. No. 13/836,310, filed Mar. 15, 2013, Wu, et al.
U.S. Appl. No. 13/903,218, filed May 28, 2013, Rodriguez-Serrano, et al.
U.S. Appl. No. 13/973,330, filed Aug. 22, 2013, Bernal, et al.
Rodriguez-Serrano, et al. "Data-driven vehicle identification by image matching" *12th European Conference on Computer Vision*, vol. 7584, pp. 536-545, Oct. 2012.
Xerox. "Transportation Solutions Offering a Spectrum of Services Worldwide", Xerox Corporation, pp. 1-8, (2012).
Lowe, et al. "Distinctive Image Features from scale-invariant keypoints" IJCV, vol. 60, pp. 91-110, (2004).
Perronnin, et al. "Fisher kernels on visual vocabularies for image categorization" CVPR, pp. 1-8, (2007).
Perronnin, et al. "Improving the fisher kernel for large-scale image classification" ECCV, pp. 143-156 (2010).
Sanchez, et al. "High-dimensional signature compression for large-scale image classification" CVPR, pp. 1665-1672 (2011).
Csurka, et al. "Visual categorization with bags of keypoints" ECCV Workshop, pp. 1-16 (2004).
Lazebnik, et al. "Beyond bags of features: spatial pyramid matching for recognizing natural scene categories" CVPR '06, Proc. 2006 IEEE Computer Society Conf. on Computer Vision and Pattern Recognition, vol. 2, pp. 2169-2178 (2006).
Jegou, et al. "Aggregating local image descriptors into compact codes" IEEE TPAMI, 34(9): 1704-1716 (2012).
Wikipedia. "Automatic number plate recognition" pp. 1-16, Retrieved from http://en.wikipedia.org/wiki/Automatic_number_plate_recognition , on Aug. 8, 2013.
Jenoptik. "Software-intelligence for numberplate recognition and real-time comparison" pp. 1-2, Retrieved from http://www.jenoptik.com/en-automatic-numberplate-recognition-systems-trafficcapture , on Aug. 8, 2013.
Privacy International. "Netherlands" pp. 1-2, Retrieved from https://www.privacyinternational.org/reports.netherlands, on Aug. 8, 2013.
Sanchez, et al. "Image classification with the Fisher Vector: Theory and Practice" Version 3, Informatics mathematics, Research Report No. 8209, pp. 1-24, Jun. 12, 2013.
Du, et al. "Preservative License Plate De-identification for privacy protection" ICDAR 2011, IEEE 2011, pp. 468-472 (2011).
Azogu, et al. "Privacy-preserving license plate image processing" $45^{th}$ Annual Simulation Symposium, GLOBECOM Workshops, IEEE 2011, pp. 34-39 (2011).
Wolf, M. "A secure and privacy-preserving electronic license plate" Automotive Safety & Security 2010, Downloaded at http://www.marko-.wolf.de/files/Wolf2010_Secure_E_Plate.pdf Jun. 21-23, 2010.

* cited by examiner

PRIVACY-PRESERVING EVIDENCE IN ALPR APPLICATIONS

BACKGROUND

The exemplary embodiment relates to object recognition and finds particular application in connection with a system and method for identification of an identifier of a vehicle while maintaining privacy of personal data.

Vehicle identification can be defined as the process of measuring a set of properties of a vehicle with one or multiple sensors and mapping it to a unique identifier. Visual sensors (e.g., cameras) are often used to capture an image containing a license plate and then an Automatic License Plate Recognition (ALPR) process is applied. Given an image containing a vehicle license plate, ALPR systems typically output the license plate number of the vehicle, which constitutes a unique identifier. The recognized identifier can be used for different purposes, such as automatic collection of tolls, enforcement, such as detection of speed violations, management of car parks, data mining for analysis of traffic patterns, and the like.

However, automatic vehicle identification poses some concerns for privacy rights, since the acquirer of the vehicle identifier, such as a car park owner, possesses data that can often be traced to the vehicle owner. There is also a risk that unauthorized persons may be able to access the data and use it for purposes other than the legitimate purposes for which it was collected.

In some countries, therefore, governments and citizens are becoming more concerned about the collection of such data and restrictions are being placed on its collection. The storage of a vehicle identifier in persistent memory has been recognized as a violation of the right to privacy in some European countries. To address this, number plate recognition system have been developed that place each passing vehicle identifier in temporary storage and access it directly in real-time to check for exceptional situations (such as a vehicle exceeding a speed limit). If there is no match, the data is not permanently stored.

Even where there is no government regulation, there is pressure to modify the process of automatic vehicle identification in car parks and other locations, including processing and storage of the identities, in order to preserve the privacy of the car park users.

U.S. patent application Ser. No. 14/054,998, filed Oct. 16, 2013, entitled DELAYED VEHICLE IDENTIFICATION FOR PRIVACY ENFORCEMENT, by Jose-Antonio Rodriguez Serrano, et al., the disclosure of which is incorporated herein by reference in its entirety, discloses a method for matching two license plate regions of two images without requiring recognizing the identity, e.g. the plate number, of the vehicles. The method preserves user privacy to comply with privacy requirements, since ALPR is performed only if some condition is met.

However, some regulations may require that the service operator provides proof that both the timestamp and the image at both locations are valid. This may raise concerns that recording time-stamped images taken at known locations may violate the protection of drivers' privacy, in view of other regulations.

There remains a need for a system and method which provides for the recognition of a unique identifier of an object, such as a vehicle, when a condition is met, and for providing proof of the validity of the underlying evidence used to determine that the condition is met, while at the same time, preserving the privacy of persons associated with the identifier.

INCORPORATION BY REFERENCE

The following references, the disclosures of which are incorporated herein by reference in their entireties, are mentioned:

U.S. Pub. No. 20100226564, entitled FRAMEWORK FOR IMAGE THUMBNAILING BASED ON VISUAL SIMILARITY, by Luca Marchesotti, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. Pub. No. 20130060786, published Mar. 7, 2013, entitled TEXT-BASED SEARCHING OF IMAGE DATA, by Jose Antonio Rodriguez Serrano, et al.

U.S. Pub. No. 20130129151, published May 23, 2013, entitled METHODS AND SYSTEMS FOR IMPROVED LICENSE PLATE SIGNATURE MATCHING BY SIMILARITY LEARNING ON SYNTHETIC IMAGES, by Jose Antonio Rodriguez Serrano, et al.

U.S. Pub. No. 20130129152, published May 23, 2013, entitled METHODS AND SYSTEMS FOR IMPROVING YIELD IN WANTED VEHICLE SEARCHES, by Jose Antonio Rodriguez Serrano, et al.

U.S. Pub. No. 20130182909, published Jul. 18, 2013, entitled IMAGE SEGMENTATION BASED ON APPROXIMATION OF SEGMENTATION SIMILARITY, by Jose Antonio Rodriguez Serrano.

U.S. Pub. No. 20130259314, published Oct. 3, 2013, entitled METHODS AND SYSTEMS FOR ENHANCING THE PERFORMANCE OF AUTOMATED LICENSE PLATE RECOGNITION APPLICATIONS UTILIZING MULTIPLE RESULTS, by Vladimir Kozitsky, et al.

U.S. application Ser. No. 13/527,228, filed Jun. 19, 2012, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.

U.S. application Ser. No. 13/592,961, filed on Aug. 23, 2012, entitled REGION REFOCUSING FOR DATA-DRIVEN OBJECT LOCALIZATION, by Jose Antonio Rodriguez Serrano.

U.S. application Ser. No. 13/757,014, filed on Feb. 1, 2013, entitled LABEL-EMBEDDING FOR TEXT RECOGNITION, by Jose Antonio Rodriguez Serrano, et al.

U.S. application Ser. No. 13/836,310, filed on Mar. 15, 2013, entitled METHODS AND SYSTEM FOR AUTOMATED IN-FIELD HIERARCHICAL TRAINING OF A VEHICLE DETECTION SYSTEM, by Wencheng Wu, et al.

U.S. application Ser. No. 13/903,218, filed May 28, 2013, entitled SYSTEM AND METHOD FOR OCR OUTPUT VERIFICATION, by Jose Antonio Rodriguez Serrano, et al.

U.S. application Ser. No. 13/973,330, filed Aug. 22, 2013, entitled SYSTEM AND METHOD FOR OBJECT TRACKING AND TIMING ACROSS MULTIPLE CAMERA VIEWS, by Edgar A. Bernal, et al.

BRIEF DESCRIPTION

In accordance with one aspect of the exemplary embodiment, a method for preserving privacy of evidence includes receiving an encrypted first image which has been generated by encrypting a first image with a symmetric cryptographic key that is based on first information extracted from the first image and first metadata associated with the first image. A link is established between a second image and the first image. The first metadata is received. Second information is extracted from the second image. The symmetric cryptographic key that was used to encrypt the first image is reconstructed, based on the second information extracted from the second image and the first metadata. The reconstructed symmetric cryptographic key permits the first encrypted image to be decrypted to regenerate the first image.

One or more of the steps of the method can be performed with a processor.

In accordance with another aspect of the exemplary embodiment, a system includes memory which receives an encrypted first image which has been generated by encrypting a first image with a symmetric cryptographic key that is based on first identifier information extracted from the first image and first metadata associated with the first image, the first metadata, and a first visual signature which has been extracted from the first image. A signature matching component compares the first visual signature with a second visual signature extracted from a second image to establish a link between the second image and the first image. An identifier recognition component extracts second identifier information from the second image. A cryptographic key reconstruction component reconstructs the symmetric cryptographic key that was used to encrypt the first image based on the second identifier information extracted from the second image and the first metadata. The reconstructed symmetric cryptographic key permits the first encrypted image to be decrypted to regenerate the first image. At least one processor implements the signature matching component, identifier recognition component, and cryptographic key reconstruction component.

In accordance with another aspect of the exemplary embodiment, a method for preserving privacy of evidence includes, in a first location, capturing a first image of a vehicle and associated first metadata and generating an encrypted first image by encrypting the first image with a symmetric cryptographic key that is based on first identifier information extracted from the first image and the first metadata. In a second location, spaced from the first location, a second image of a vehicle and associated second metadata are captured. In at least one of the second location and a third location, the encrypted first image and the first metadata are received. The method further includes determining that a condition is met based on the first and second metadata and reconstructing the symmetric cryptographic key from the first metadata and the second identifier information extracted from the second image, thereby establishing that the second identifier information matches the first identifier information.

The first image and identifier information extracted at the first location may both be discarded when the encrypted image has been generated so that they are not available to the second or third locations.

Figure 1:
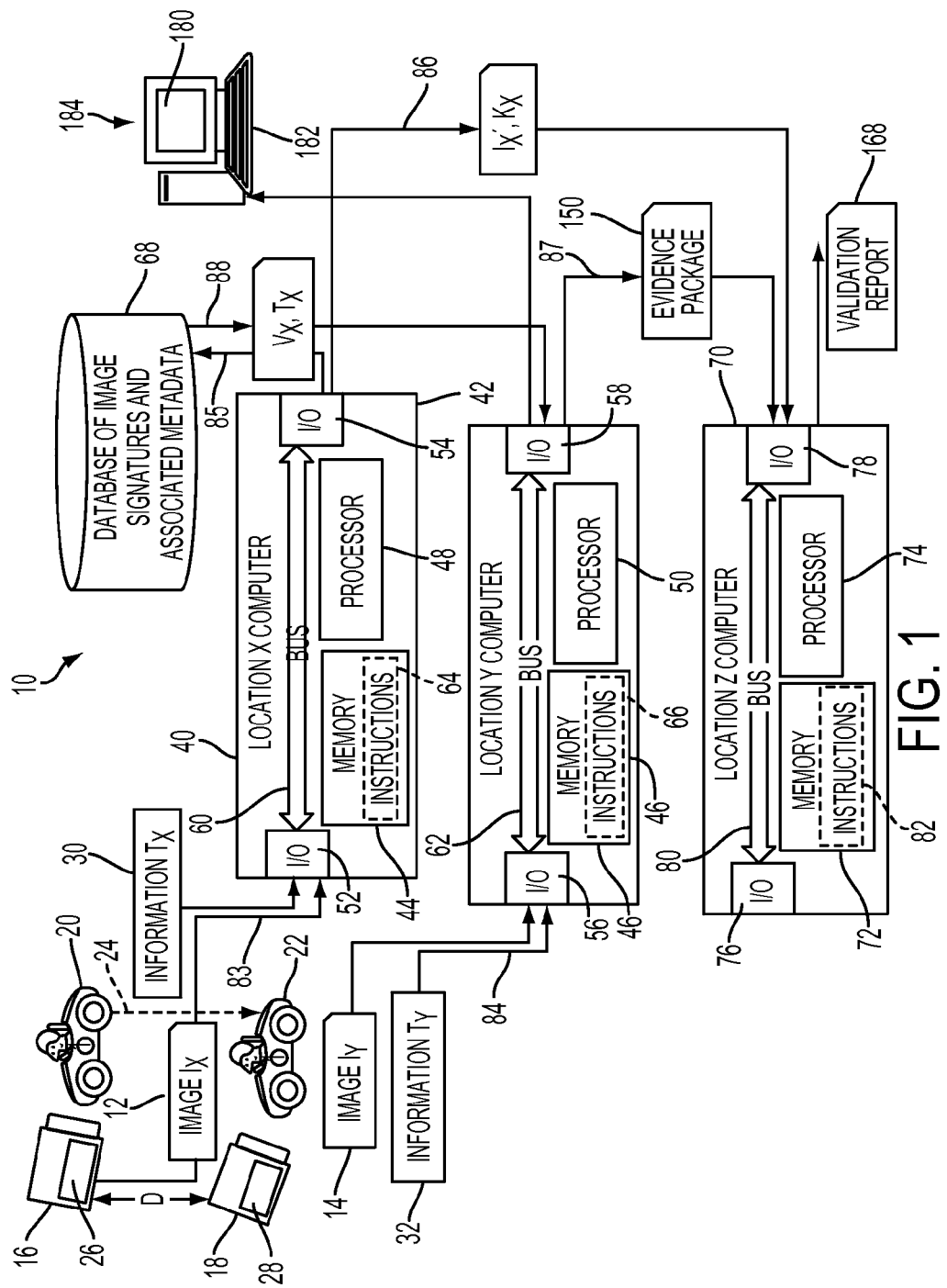
FIG. 1 is a functional block diagram of a system for privacy-preserving identifier recognition in accordance with a first embodiment.

DETAILED DESCRIPTION application Ser. No. 14/054,998, discloses a method for maintaining privacy of data, such as a vehicle identifier (license plate number), which includes recognition of the identifier when a match between visual signatures extracted from images of vehicles at two locations is established and a condition is met. The present system and method also distinguish between matching signatures and recognizing license plate numbers. In particular, the exemplary method includes matching visual signatures and retrieving metadata (such as a timestamp) associated with a successful match, which can be used to determine whether a condition is met. The exemplary system and method also use a symmetric cryptographic key that is derived from information extracted from the recognized identifier (and associated metadata) which can be reconstructed at a different location, based on the recognized identifier and earlier acquired metadata. The symmetric cryptographic key can be signed with a private key that can be shared by service providers in a secure manner (i.e., without exchanging the private key itself). The exemplary system and method provides a further assurance that evidence used to establish that a condition is met has not been tampered with or falsified.

Vehicle identification may be desired at multiple locations and/or at different times, for example at the entry and exit of a car park or at different points on a road. For the sake of simplification, two locations X and Y which are spaced from each other by a distance D are considered, although it is to be appreciated that X and Y may be at or close to the same location.

In one embodiment, the aim is to find correspondences between the vehicle identities at X and Y, and when a correspondence between two identities has been established, to determine whether a certain condition is met that depends on associated information captured at X and Y. When the condition is met, a specified action is triggered, such as communicating information to law enforcement or to the owner of the vehicle matching the license plate.

For example, in a speed enforcement application, if a correspondence between vehicle identities at X and Y is established from images captured at X and Y, the information associated with the captured images may include timestamps ($T_X$, $T_Y$) at which the vehicle was present at X and Y and optionally respective geographical locations ($L_X$, $L_Y$), e.g., geographical coordinates of X and Y. The condition checked may be whether the identified vehicle's speed exceeds a threshold. The speed may be the average speed, computed as the distance D between $L_Y$ and $L_Y$ divided by the time difference $T_Y$–$T_X$. If the condition is met, e.g., the speed exceeds a predefined threshold, the vehicle identifier recognized from the captured image of the vehicle, e.g., at point Y, for example, is used to implement a process, such as generating an alert that the identified vehicle incurred a speed violation and launching an appropriate corresponding process, such as issuance of a speeding ticket.

The exemplary system and method provides for keeping evidence used to determine that the condition that was met, but still preserving user privacy. In particular, the evidence is readable only if the identifier matches and otherwise remains an opaque piece of data. It is assumed that the data owner (e.g., vehicle driver) trusts the service operator to process his or her data.

In one embodiment, an evidence package is created which allows a third party to verify that the condition was met by providing a key which can be used to decrypt an encrypted image of the vehicle acquired at the first and second locations, the key having been derived from information (an identifier) extracted from the image and associated metadata used to determine if the condition is met, and which allows the key to be verified.

The hashing performed in the exemplary methods discussed below is a one way encryption process which generates a hash value (or "hash") based on at least one (generally, at least two or more) pieces of information. Given the hash value, the original pieces of information cannot be reconstructed (at least not without undue computational expense and a significant number of examples of such data). Where two or more pieces of information are used to form a hash, these are first combined, e.g., concatenated, in a predefined order.

The encryption keys used herein convert the information to binary data that can be represented as a string. The string can be decrypted to regenerate the original information with the same key, in the case of symmetric encryption, or with a different key, in the case of asymmetric encryption.

With reference to FIG. 1, an environment in which a system 10 for privacy-preserving identifier recognition operates is illustrated. Sets 12, 14 of images $I_X$, $I_Y$ are captured at locations X and Y by image capture devices 16, 18, such as cameras, positioned at these locations. Image capture devices 16, 18, may be configured to capture automatically an image of each vehicle as it passes the respective location, or only some of the vehicles, depending on the application. Each captured image $I_X$, $I_Y$ includes at least a portion of a vehicle 20, 22 which is capable of moving the distance D between the two locations X,Y, e.g., along a predefined path 24, such as a road, bus route, car park lane, or the like between the two locations. Each image capture device 16, 18, or a separate information capture component 26, 28, captures information 30, 32 associated with the capture of each image, e.g., in the form of image metadata $T_X$, $T_Y$, such as a respective timestamp and/or other types of information available. In the exemplary embodiment, location X is upstream on the path from location Y, such that for a given vehicle, image $I_X$ and its associated metadata $T_X$ is captured earlier in time than image $I_Y$ and its associated metadata $T_Y$.

The system includes computing devices 40, 42, associated with the two locations, each with memory 44, 46, a processor 48, 50, and one or more input/output devices 50, 52, 54, 56 for communication with external devices and/or with each other. These hardware components of the respective computing devices are communicatively connected by a data/control bus 60, 62. Memory 44, 46 store instructions 64, 66 for performing parts of the exemplary method, which are executed by the processors 48, 50. A database 68 is hosted by one of the computing device or by a remote computing device and stores computed image signatures for the images $I_X$ and associated metadata $T_X$.

A third computing device 70, e.g., associated with a third location Z, serves as a validating authority, and includes memory 72, a processor 74 and one or more input/output devices 76, 78, all communicatively connected by a data/control bus 80. Memory 72 stores instructions 82 for performing validation in the exemplary method, which are executed by the processor 74. Computing devices may communicate with the image capture devices 16, 18, database, and each other via wired or wireless links 83, 84, 86, 86, 87, 88, such as a telephone line, local area network, or a wide area network, such as the Internet.

Figure 2:
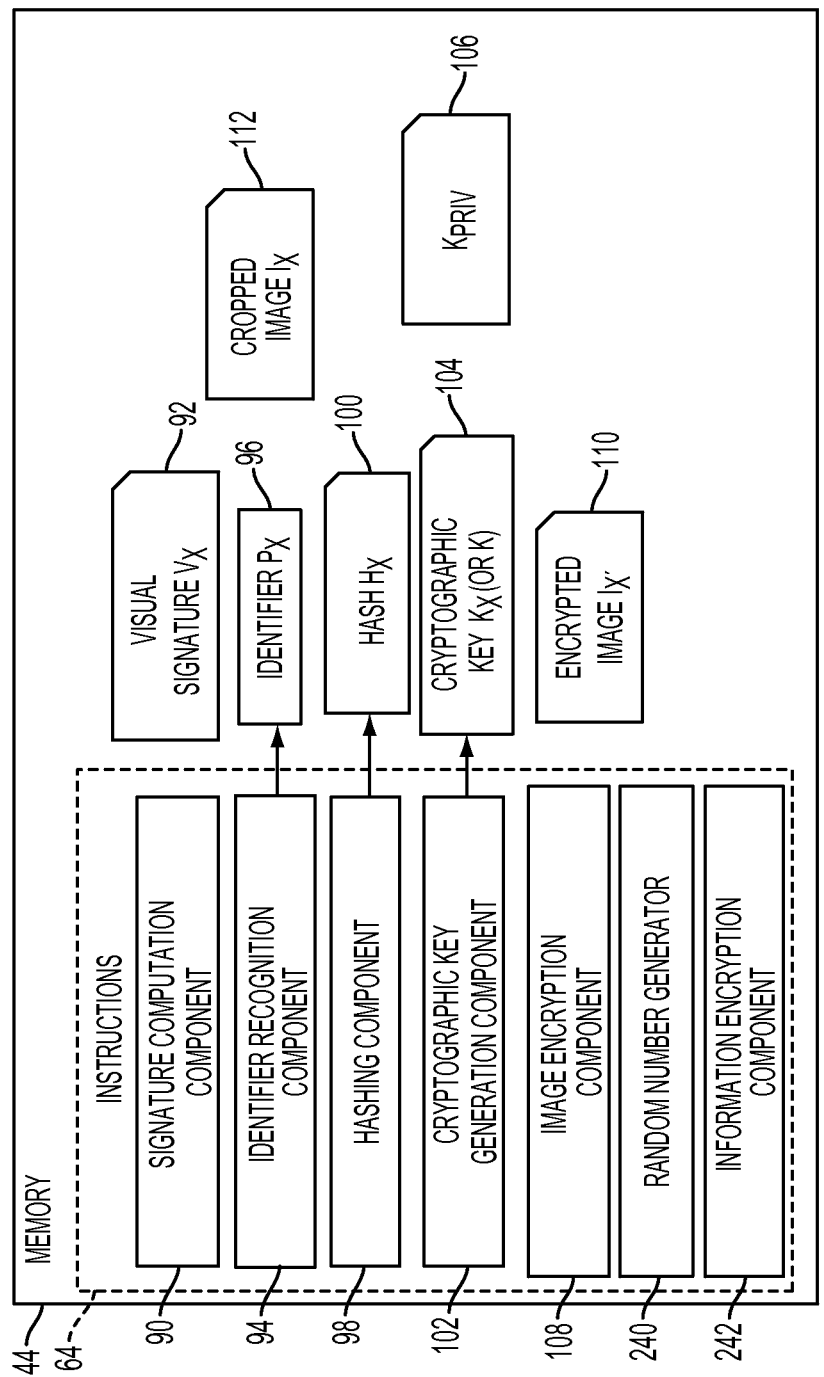
FIG. 2 illustrates components of a first location computer system in the system of FIG. 1.
Figure 3:
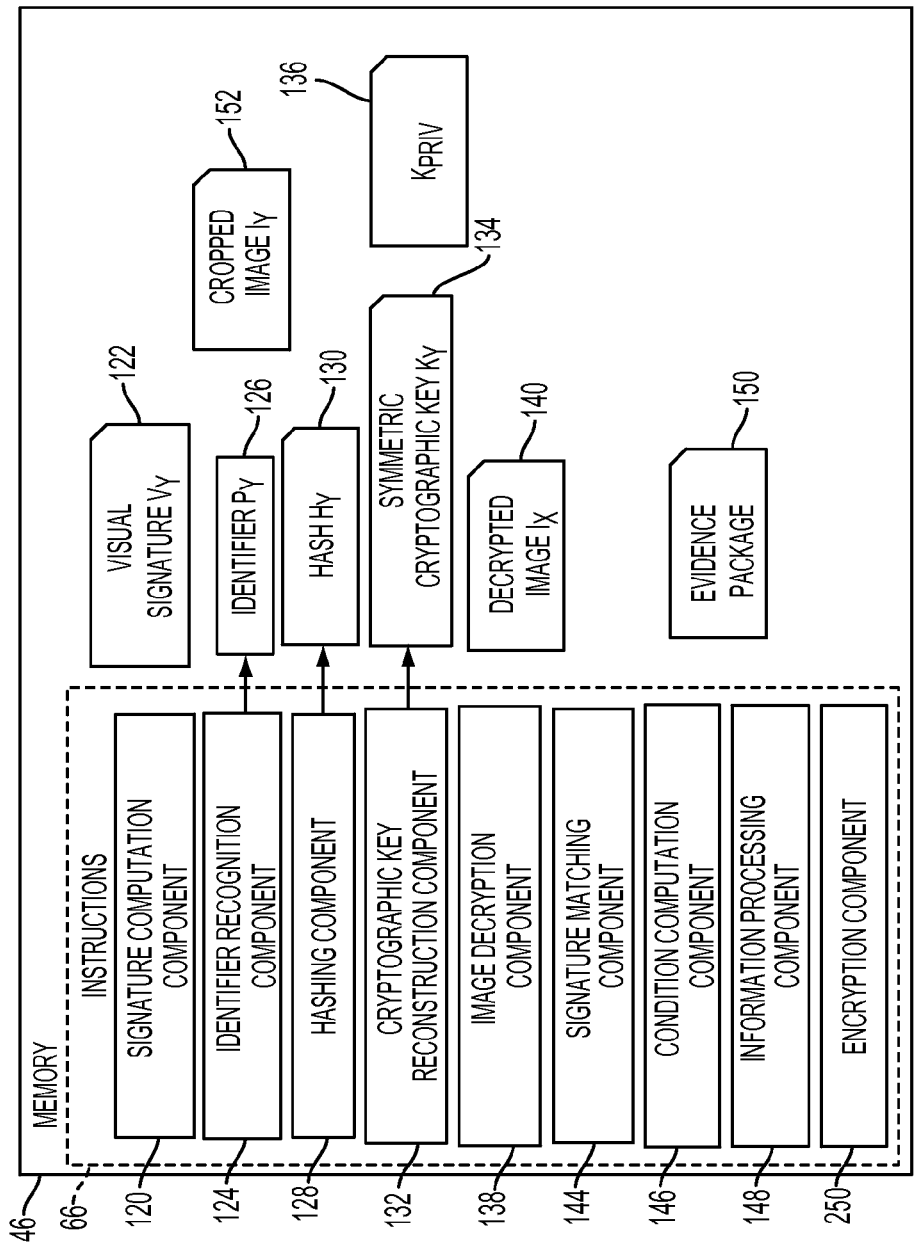
FIG. 3 illustrates components of a second location computer system in the system of FIG. 1.
Figure 4:
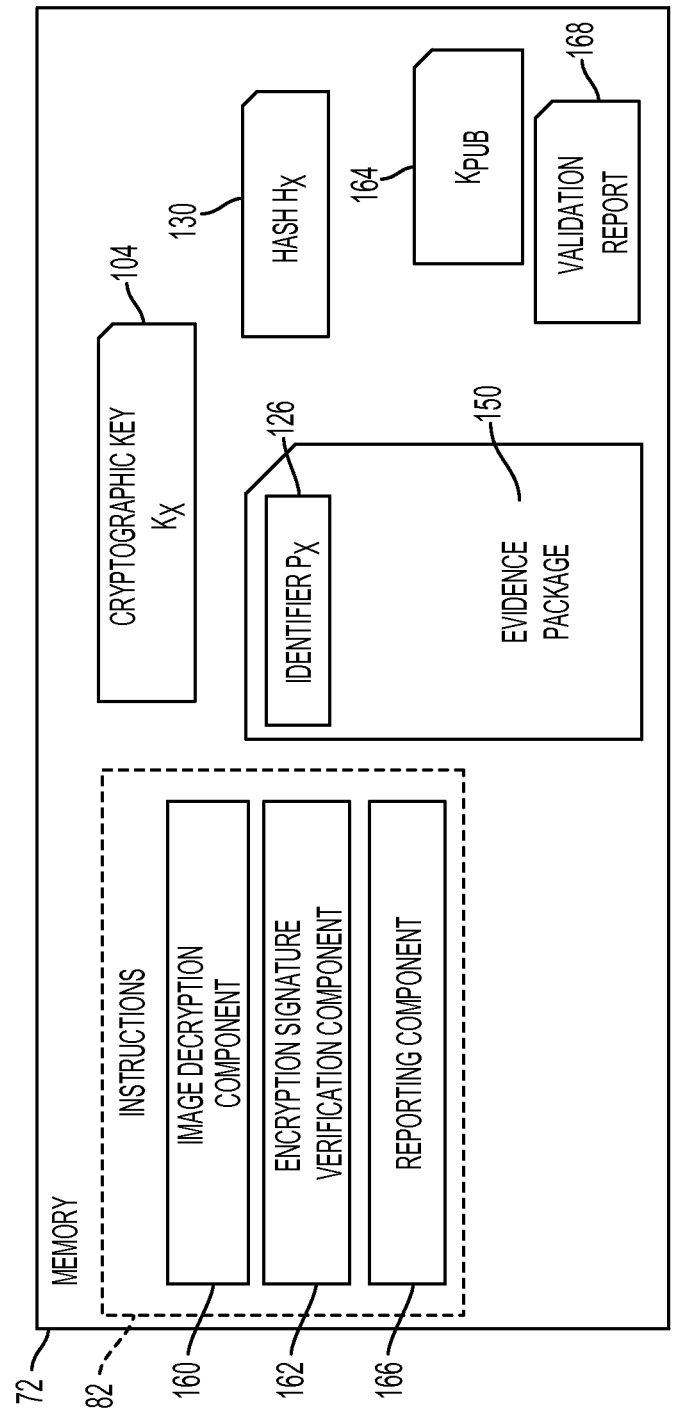
FIG. 4 illustrates components of a validation computer system in the system of FIG. 1.

FIGS. 2-4 illustrate exemplary software components of these computing devices, as discussed with reference to FIGS. 5 and 6.

With reference to FIG. 2, the instructions 64 include a signature computation component 90 for computing a visual signature $V_X$ 92 based on image $I_X$, an identifier recognition component 94, e.g., which performs ALPR on image $I_X$ to generate an identifier $P_X$ 96, a one-way encryption component (hashing component) 98, for computing a hash $H_X$ 100 of ($P_X$, $T_X$), an encryption key generation component 102, for generating a symmetric cryptographic key $K_X$ 104 from $H_X$ using a private key $K_{priv}$ 106, which may be stored in memory 44, an image encryption component 108, which encrypts image $I_X$ using symmetric cryptographic key $K_X$ to generate an encrypted image $I_X'$ 110, which may be stored in the database 68.

The signature computation component 90 may include a cropping component which automatically extracts a cropped image 112 from the received image $I_X$ 12, which is predicted to include an object of interest (e.g., the area including the license plate number). The signature computation component 90 then computes the visual signature, e.g., based solely on the pixels of the cropped region (or a further cropped region). The computed visual signature $V_X$, metadata $T_X$ (optionally encrypted) and optionally also encrypted image $I_X'$ are stored in the database 68. The database 68 may be periodically purged to remove data which is no longer relevant, such as images $I_X'$ and their associated metadata that are out of date, for example, when the condition can no longer be met.

With reference to FIG. 3, the instructions 66 include a signature computation component 120 (analogous to component 90) for computing a visual signature $V_Y$ 122 based on image $I_Y$, an identifier recognition component 124 (analogous to component 94), e.g., which performs ALPR on image $I_Y$ to generate an identifier $P_Y$ 126, a one-way encryption component (hashing component) 128 (analogous to component 98), for computing a hash $H_Y$ 130 of ($P_Y$, $T_X$), a cryptographic key reconstruction component 132 (analogous to component 102), for reconstructing a cryptographic key $K_Y$ 134 from $H_Y$ using a private key $K_{priv}$ 136 (which is the same as the key $K_{priv}$ 106), which may be stored in memory 46, an image decryption component 138, which decrypts encrypted image $I_X'$ 110 using cryptographic key $K_Y$ as a symmetric decryption key to generate a decrypted image 140 (which should be the same as the input image $I_X$), a signature matching component 144, which retrieves signature $V_X$ and compares it with signature $V_Y$ 122 to determine whether there is a match, a condition computation component 146 which determines whether a condition is met, based on $T_X$ and $T_Y$, and an information processing component 148, which outputs an evidence package 150 based on the information computed by the other components.

The signature computation component 120 may include a cropping component which automatically extracts a cropped image 152 from the received image $I_Y$ 14, which is predicted to include an object of interest (e.g., the area including the license plate number). The signature computation component 120 then computes the visual signature, e.g., based solely on the pixels of the cropped region (or of a further cropped region). The computed visual signature $V_Y$ and metadata $T_Y$ may be stored in memory 46.

As will be appreciated, some preprocessing of the captured images $I_X$, $I_Y$ may be performed at any time before and/or during the computing of the visual signature, such as scaling, skew removal, reducing the pixel resolution, image enhancement techniques, conversion from color to monochrome, and the like.

The signature matching component 144 accesses the database 68 with each new visual signature $V_Y$ to identify one or more matching signatures from the visual signatures $V_X$ computed for vehicles whose images were previously captured at location X. The signature matching component retrieves the visual signature $V_X$ that is the closest match (referred to as V*), together with its associated meta-data $T_X$ (referred to as T*).

The identifier recognition component 94, 124 performs character recognition (ALPR) on the image $I_X$ or $I_Y$, respectively, to generate a character sequence $P_X$ or $P_Y$ respectively corresponding to the recognized identifier of the vehicle, such as the license plate number.

The condition computation component 146 performs a test to determine whether a condition is met, which is a function of $T_Y$ and T*. For example, component 146 computes an average speed based on the time difference between T* and $T_Y$. If the test is satisfied, e.g., if the result of the test is positive, the information processing component 148 outputs the evidence package 150 which confirms that the test has been met. This may include, for example, the automated generation of a notice that a violation has taken place, such as a speeding ticket, unpaid vehicle toll, parking ticket, or the like, depending on the application.

With reference to FIG. 4, the instructions 82 include an image decryption component 160 (analogous to component 120), which receives symmetric cryptographic key $K_X$ and decrypts the encrypted image $I_X'$ with $K_X$ to obtain the image $I_X$, and an encryption signature verification component 162, which verifies that the symmetric cryptographic key $K_X$ is valid by using a public key $K_{pub}$ 164, provided by the service operator, and the result which is obtained by hashing ($P_X$, $T_X$). A reporting component 166 generates and outputs a validation report 168 which indicates whether the encryption signature is valid and a copy of the images $I_X$ and $I_Y$ and their associated metadata, for use by the owner, government authority responsible for enforcement, or the like.

With reference once more to FIG. 1, the system 10 may be resident on one or more computing devices 40, 42, 70. Each computing device may be a specific or general purpose computing device, such as a PC, such as a desktop, a laptop, palmtop computer, portable digital assistant (PDA), server computer, cellular telephone, tablet computer, pager, combination thereof, or other computing device capable of executing instructions for performing the exemplary method.

The system 10 may communicate, via one or more of input/output interfaces 54, 74, 78, with one or more of a display device 180, such as an LCD screen or computer monitor, for displaying information to users, and a user input device 182, such as a keyboard or touch or writable screen, and/or a cursor control device, such as mouse, trackball, or the like, for inputting text and for communicating user input information and command selections to the respective processor 48, 50. 74. The display device and user input device are illustrated as being part of a client computing device 184, although in other embodiments, they may be directly linked to one of the system computing devices 40, 42, 70.

The memory 44, 46, 72 may represent any type of non-transitory computer readable medium such as random access memory (RAM), read only memory (ROM), magnetic disk or tape, optical disk, flash memory, or holographic memory. In one embodiment, the memory 44, 46, 72 comprises a combination of random access memory and read only memory. In some embodiments, the processor 48, 50, 74 and respective memory 44, 46, 72 may be combined in a single chip.

The network interfaces 52, 54, 56, 58, 76, 78 allow the respective computers to communicate with other devices via a computer network, such as a local area network (LAN) or wide area network (WAN), or the Internet, and may comprise a modulator/demodulator (MODEM) a router, a cable, and and/or Ethernet port.

The digital processors 48, 50, 74 can be variously embodied, such as by a single-core processor, a dual-core processor (or more generally by a multiple-core processor), a digital processor and cooperating math coprocessor, a digital controller, or the like. The digital processor 48, 50, 74, in addition to controlling the operation of the respective computer, executes instructions stored in memory for performing at least a part the method outlined in FIG. 7.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
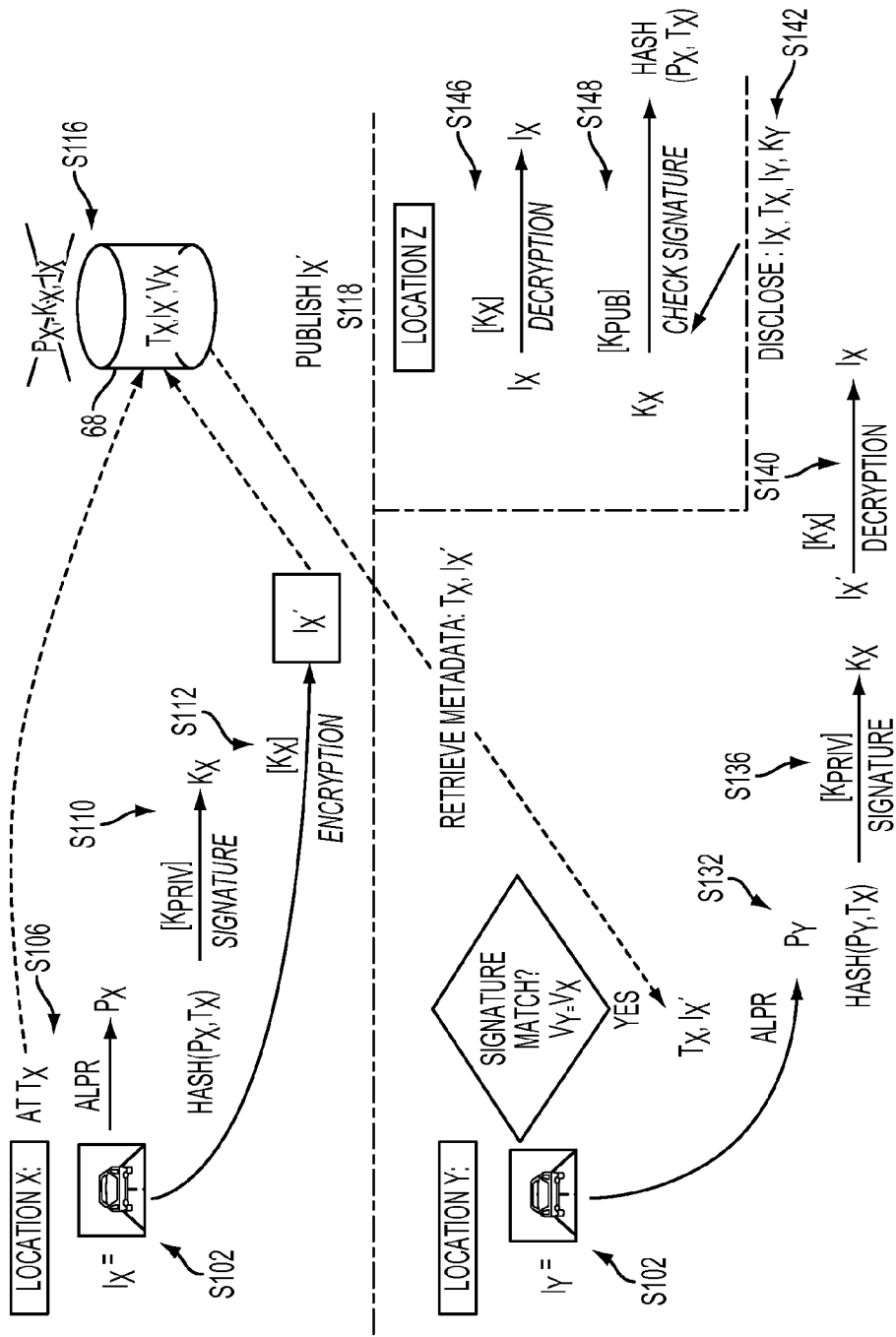
FIG. 5 graphically illustrates a method for privacy-preserving identifier recognition in accordance with a second embodiment.
Figure 6A:
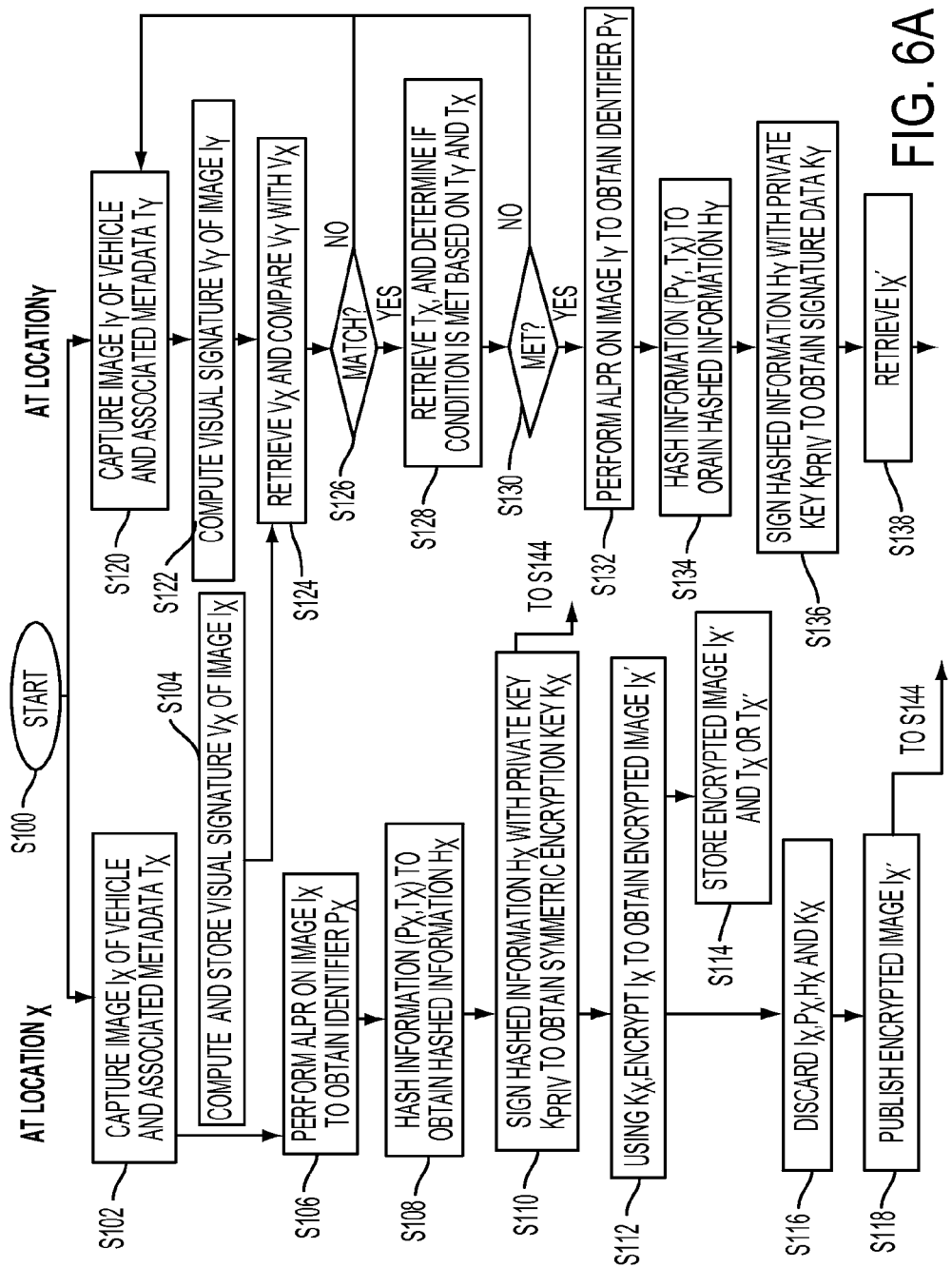
FIG. 6 (split into FIGS. 6A and 6B) is a flow chart illustrating the method for privacy-preserving identifier recognition of FIG. 5.
Figure 6B:
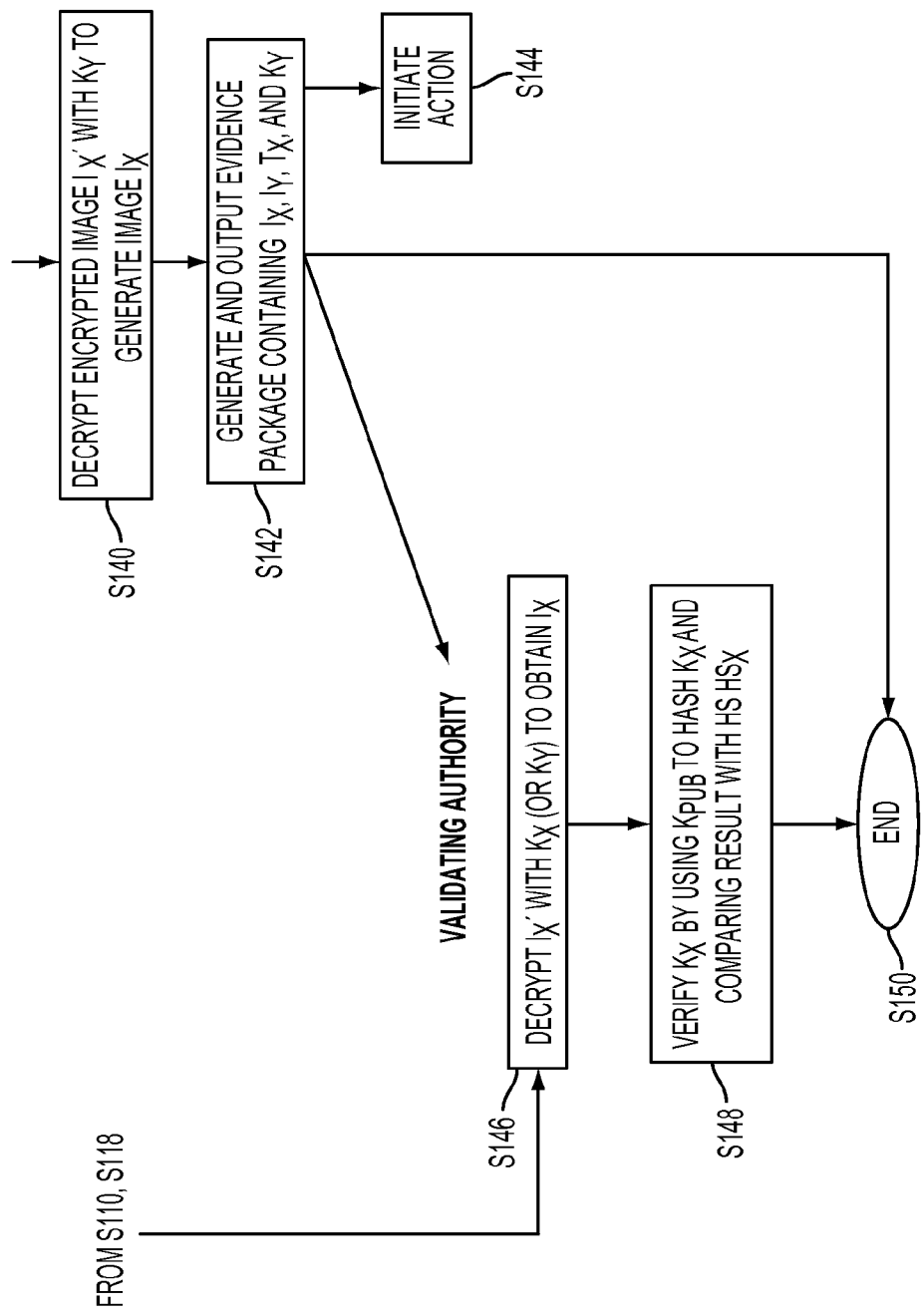

With reference to FIG. 5, an overview of a method for privacy-preserving identifier recognition is illustrated, which shows several steps of one embodiment of the method, described in further detail with respect to FIG. 6.

The method uses encryption methods, such as one or both of asymmetric- and symmetric-key encryption (also called public-key and shared-secret encryption) to provide evidence of the visual capture at location X. Such encryption systems are well known. Specifically, in asymmetric-key encryption, two separate cryptographic keys are employed, one of which is a secret (or private) key and the other of which is a public key, which is mathematically linked to the private key. The public key is used to encrypt the data and to verify a digital signature, while the private key is used to decrypt or to create a digital signature. In symmetric-key encryption the same cryptographic key, or a substantially similar copy thereof, can be used for both encryption and decryption.

There are three main participants in the method in this embodiment:

1) A service operator, e.g., car park operator, toll gate operator, or the like operating at locations X and Y, 2) A verifying authority, e.g., at Z, and 3) A vehicle and, indirectly via the vehicle license plate, the driver and/or owner of the vehicle.

The method begins at S100.

At S102, at location X, a first image $I_X$ of a vehicle is acquired, as well as metadata, such as a time $T_X$ at which the image $I_X$ is captured, by capture device 16, 26.

At S104, a visual signature $V_X$ of image $I_X$ is computed (e.g., by signature computation component 90). The signature may be stored in database 68, along with $T_X$ or $T_X'$ (and/or with a unique EventId).

At S106, identifier recognition, such as ALPR, is performed on $I_X$, obtaining an identifier, such as a license plate number $P_X$ (e.g., by identifier recognition component 94).

At S108, the information ($P_X$, $T_X$) is encrypted, e.g., hashed with a one way hash function, to obtain encrypted (hashed) information $H_X$ (e.g., by hashing component 98).

At S110, the hash value $H_X$ is signed with a private key $K_{priv}$ to obtain symmetric cryptographic key $K_X$ (e.g., by cryptographic key generation component 102).

At S112, using symmetric encryption key $K_X$, image $I_X$ is encrypted, to obtain an encrypted image $I_X'$ (e.g., by image encryption component 108).

At S114, the encrypted image $I_X'$, together with the associated metadata $T_X$ and/or $T_X'$ (an encrypted value of $T_X$ generated by encrypting $T_X$ with, for example, a shared key) are stored in database 68. These can be stored with a unique EventId to make the link with the Signature $V_X$.

At S116, the original image $I_X$ as well as $P_X$, $HS_X$, and $K_X$ may be discarded and are thus not made available to the second location Y. The method can thus satisfy a requirement that the identifier is not stored but is maintained only transiently for a few seconds or less than a second.

At S118, the encrypted image $I_X'$ may be made public. For example, $I_X'$ can be disclosed to the verifying authority, or to some third party or to anyone since it is encrypted, and neither the operator nor anyone else can decrypt it, other than by breaking the encryption scheme. This ensures that the information contained in the image is private and thus complies with any privacy regulations which may attach to such information. The encrypted image $I_X'$ can later be used to can ensure that the clock used in generating metadata $T_X$ in the equipment at location X is correct.

Steps S102 to S118 may be performed at location X, for example, by the computer system 40 at location X, or partly manually, under the control of the service operator.

At S120, at location Y, a new (second) image $I_Y$ of a vehicle is acquired, as well as metadata, such as a time $T_Y$ at which the image $I_Y$ is captured (by capture device 18, 28).

At S122, a visual signature $V_Y$ of image $I_Y$ is computed (e.g., by signature computation component 120).

At S124, visual signature matching is performed (e.g., by signature matching component 144), in which $V_Y$ is compared with one or more signatures $V_X$, received from location X (e.g., retrieved form database 68) to determine whether there is a match.

At S126, if a match is found, the method proceeds to S128, otherwise the method returns to S120 or ends.

At S128, metadata $T_X$ is retrieved (or $T_X'$ is retrieved and decrypted to generate $T_X$) and $T_X$ and $T_Y$ are used to determine if a condition is met, e.g., based on a difference between $T_X$ and $T_Y$ and optionally also based on the distance D between the first and second locations, such as whether the vehicle exceeded a predefined speed between X and Y or exceeded an authorized time in a parking lot, or the like (e.g., by condition computation component 146).

At S130, if the condition is met, the method proceeds to S132, otherwise the method returns to S120 or ends.

At S132, identifier recognition, such as ALPR, is performed on $I_Y$, obtaining an identifier, such as a license plate number $P_Y$ (e.g., by identifier recognition component 124).

At S134, the information ($P_Y$, $T_X$) is encrypted e.g., hashed, with the same one-way hash function as was used for the information ($P_X$, $T_X$), to produce a hash value $H_Y$ (which should be the same value as $H_X$, if the ALPR has been performed correctly) (e.g., by hashing component 128).

At S136, the hash value $H_Y$ is signed with the private key $K_{Xpriv}$, to obtain the encryption key $K_Y$ (which should be the same as $K_X$, assuming that $P_X$ and $P_Y$ are the same) (e.g., by cryptographic key generation component 132).

At S138, the encrypted image $I_X'$ is retrieved and at S140, the encrypted image $I_X'$ is decrypted with $K_Y$ (which is assumed to be a symmetric key) to obtain image $I_X$ (e.g., by decryption component 138).

At S142, an evidence package, which includes $I_X$, $I_Y$, $T_X$, and $K_Y$ is generated and provided to the validation authority and/or to the vehicle owner (e.g., by information processing component 148).

At S144, an action may be initiated, such as notifying the vehicle owner of a violation.

Steps S120 to S144 may be performed at location Y, for example, by the computer system at location Y, or partly manually, under the control of the service operator or a second service operator.

Given the encrypted image $I_X'$, anyone, e.g., the car owner or validation service at location Z, provided with $K_X$ can:

a) Decrypt $I_X'$ with $K_X$ to obtain $I_X$ (S146) and b) Verify the signature $K_X$ by using the service operator's public key $K_{pub}$ to determine whether $HS_X$ is the signature of the result obtained by hashing ($P_X$, $T_X$) (S148). The two values can therefore be compared to see if they are the same and if so, the signature is verified.

The method ends at S150.

The exemplary method can provide several advantages, such as:

a. It allows the operator to provide the image $I_X$ taken at location X to the car owner or to the authorities, in a secure way-even though the originally captured digital image has been deleted.

b. It avoids allowing access to this image unless the two visual signatures match.

c. It provides strong evidence that the condition that was met.

As will be appreciated, automated license plate recognition is subject to some errors, particularly when the lighting is poor at the time of image capture. At location Y, an error can be dealt with by a human operator since the image itself is available. At location X, if the license plate was badly recognized, the operator cannot decode image $I_X'$ based on $P_Y$, since it is different from $P_X$ and thus generates a different hash $H_Y$. In some embodiment, the system may attempt various probable variations on $P_Y$ which are common recognition errors, such as recognizing a zero as a letter O, a letter B as an 8, and so forth, allowing $I_X'$ to be decoded successfully. Only a limited number of accepted permutations may be permitted in this process, to limit the chance that a license plate which does not match is recovered. This procedure may also be performed at location A, in the event that no match is found at location B.

As another alternative, one or both of the hashing components 98, 128 may automatically generate more than one hash value $H_X$, $H_Y$ (and thus more than one cryptographic key $K_X$, $K_Y$), for example, where there are ambiguous characters in the license plate, allowing different permutations to be automatically compared with each other. For example, if the license plate has a letter O, a hash value may be created with both the letter O and the number 0.

Figure 7:
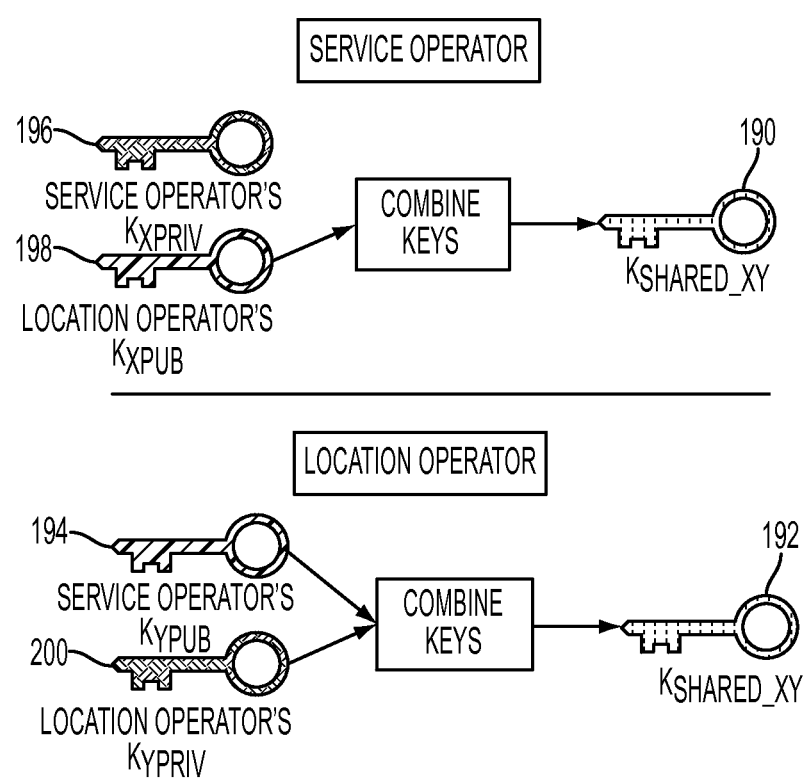
FIG. 7 graphically illustrates creation of a shared key at two locations without exchanging the shared key.

Various methods exist for creating and sharing keys between the locations. In one embodiment, Locations X and Y as treated as peers. The two computing devices may each have a public/private key pair, $K_{Xpub}$, $K_{Xpriv}$ and $K_{Ypub}$, $K_{Ypriv}$, respectively. The private keys are kept secret and are not shared. The two locations can exchange their public keys with each other and build a shared secret key in a dynamic fashion. For example, as illustrated in FIG. 7, two operators (here illustrated as a service operator and a location operator, but equally applicable to two location operators at X and Y, wish to have a copy 190, 192 of the same secret key $K_{shared}$ without transmitting it between them, and risking that it will be compromised. The location X operator has a public and private key pair $K_{Xpub}$, $K_{Xpriv}$ 194, 196 and the location Y operator has a public and private key pair $K_{Ypub}$ with $K_{Ypriv}$ 198, 200. The two operators exchange their public keys and combine the remaining keys ($K_{Ypub}$ with $K_{Xpriv}$ and $K_{Xpub}$ with $K_{Ypriv}$) to generate a shared key $K_{shared\_XY}$ which is the same for both. This can be done by using the Diffie-Hellman algorithm, which is a known algorithm for key sharing (or key exchange) between two parties who both own a pair of public and private keys. As result of using this algorithm, both parties will have the same secret key $K_{shared\_XY}$ so that they can continue their private communication using the symmetric encryption which is much faster (in terms of time and computation) than an asymmetric one.

Using this shared secret key $K_{shared\_XY}$ 190, 192, as $K_{priv}$ in FIG. 5, they can create the same cryptographic key K ($K=K_X=K_Y$) in location X and Y, respectively, based on $P_X$ (or $P_Y$) and $T_X$. Again, the key K is generated by hashing Px and Tx and then encrypting the result (of the hash) with $K_{shared\_XY}$. K is thus the result of encrypting the hash, as discussed for $K_X$ above. This approach avoids the need for a single central public/private key pair.

Publishing $I_X'$ is optional. However, it may help to reinforce the evidence by proving $I_X$ was not forged a posteriori. Publishing may include making the information available either to the public at large or to selected people or organizations.

Figure 8:
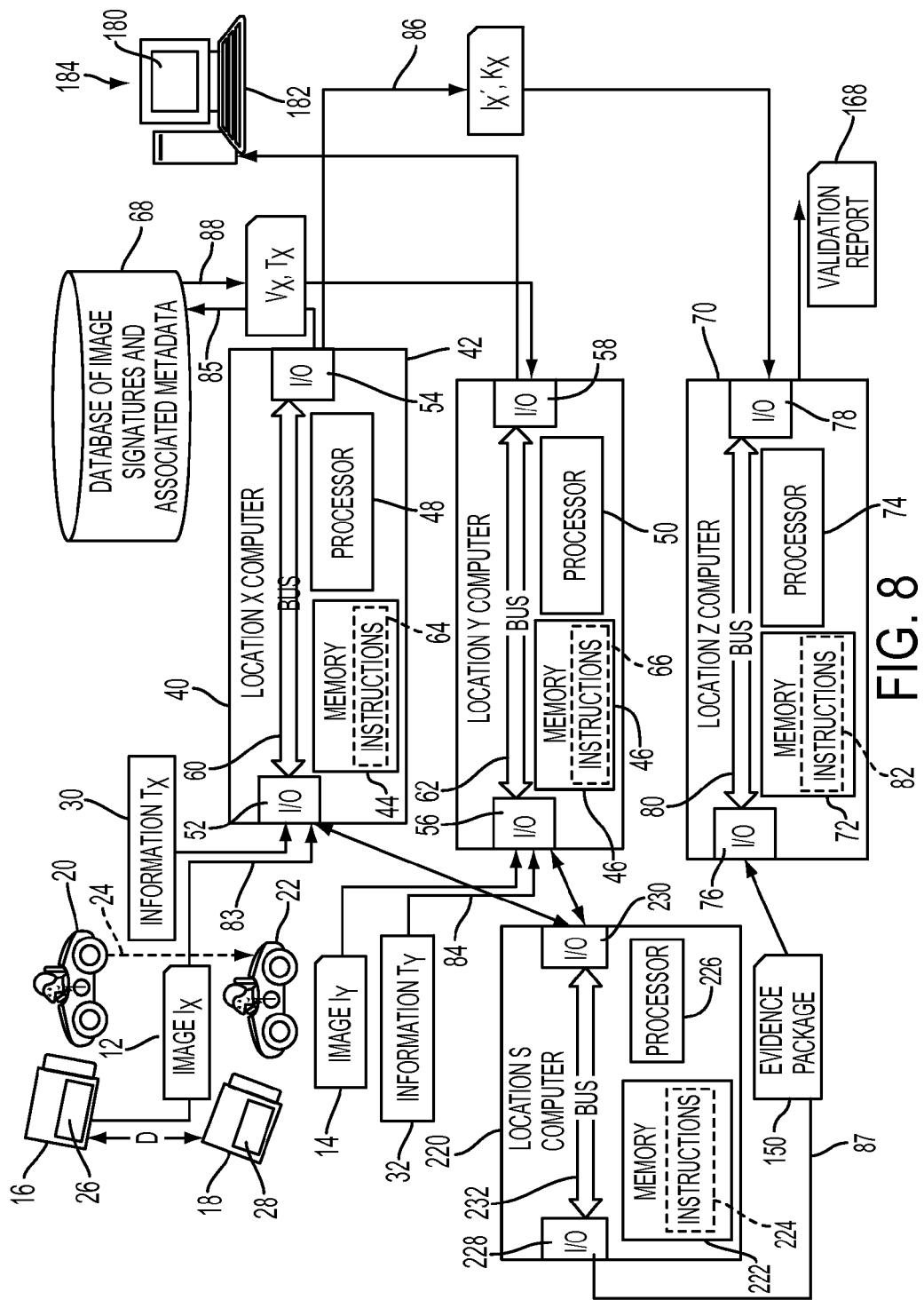
FIG. 8 illustrates is a functional block diagram of a system for privacy-preserving identifier recognition in accordance with a third embodiment.

In another embodiment, a service global operator, e.g., car park operator, toll gate operator, or the like is also a party in the method. Five parties can thus be considered: the service global operator at location S; the local operator of location X; the local operator of location Y; the validating authority at location Z; and the car, and indirectly via the vehicle plate the driver and/or owner of the car. The system may be configured as shown in FIG. 8, where similar elements are given the same numerals. This embodiment adds a global service operator computing device 220, with memory 222, storing instructions 224, a processor 226, input/output devices 228, 230 and a bus 232, which be configured as for computing devices 40, 42, etc.

Prior to performing the method:

a. The service operator, at location S, creates a pair of public/private keys $K_{Spub}$, $K_{Spriv}$;

b. The operator at location X creates a pair of public/ private keys $K_{Xpub}$, $K_{Xpriv}$;

c. The operator at location Y creates a pair of public/ private keys $K_{Ypub}$, $K_{Ypriv}$;

d. Each location shares a secret key with the service operator (denoted $Ks_{hared\_XS}$ and $Ks_{hared\_YS}$). This can be done by using the Diffie-Hellman algorithm and the service operator's and the location operator's public and private keys pair (e.g., $K_{Xpriv}$), as illustrated in FIG. 7. As result of using this algorithm, both X and S will have the same secret key $Ks_{hared\_XS}$, whereby they can continue their private communication using symmetric encryption which is much faster (in terms of time and computation) than asymmetric.

Figure 9:
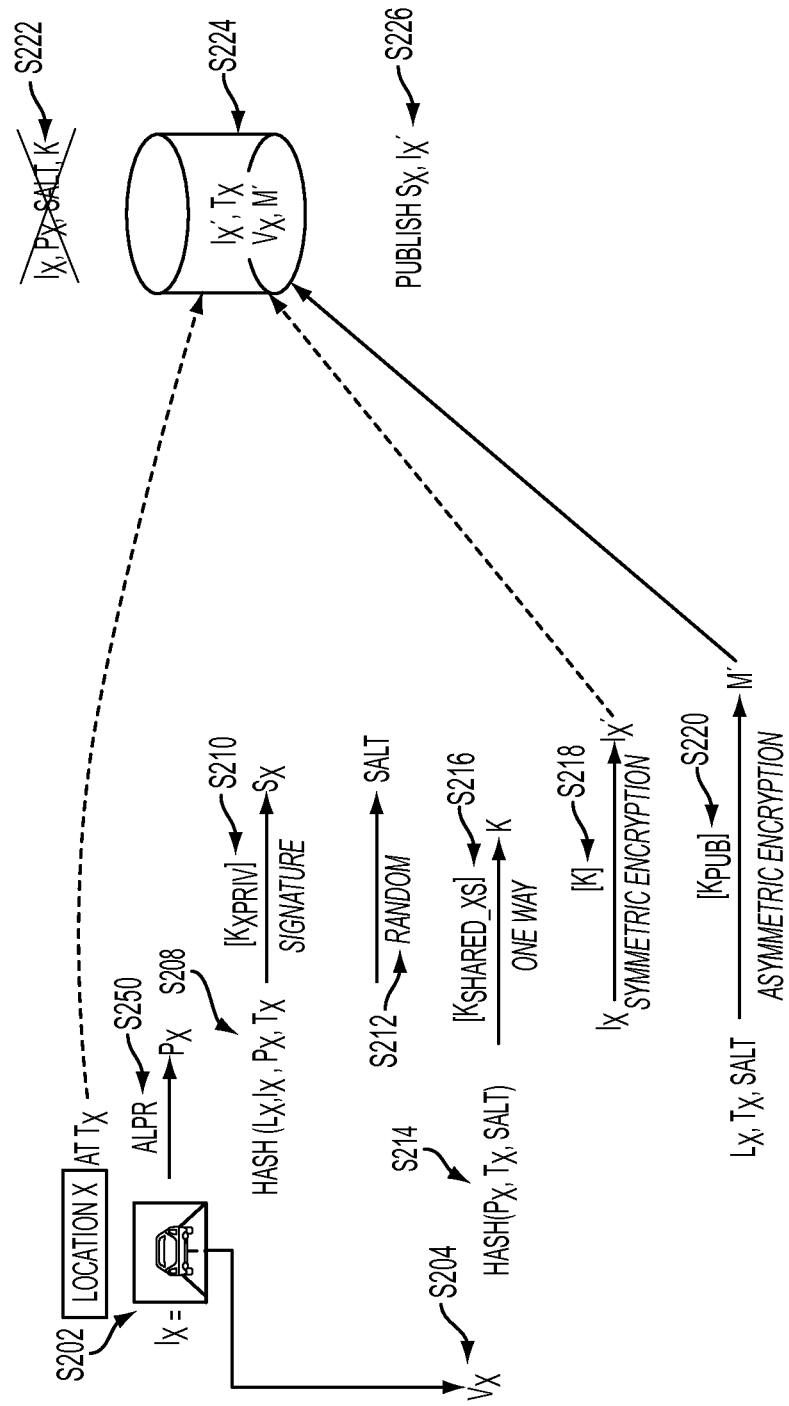
FIG. 9 graphically illustrates a first part of a method for privacy-preserving identifier recognition in accordance with a fourth embodiment.
Figure 10:
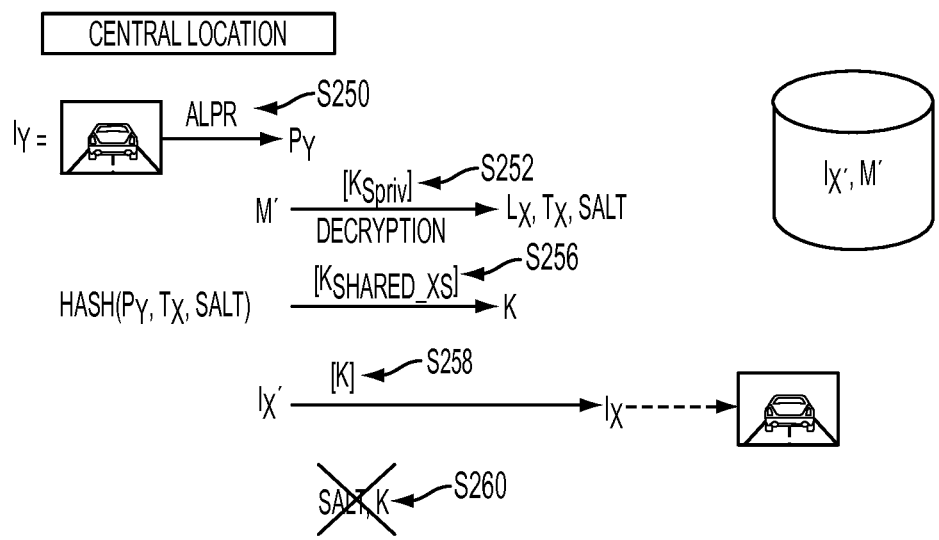
FIG. 10 graphically illustrates a second part of the method for privacy-preserving identifier recognition in accordance with the fourth embodiment.
Figure 11A:
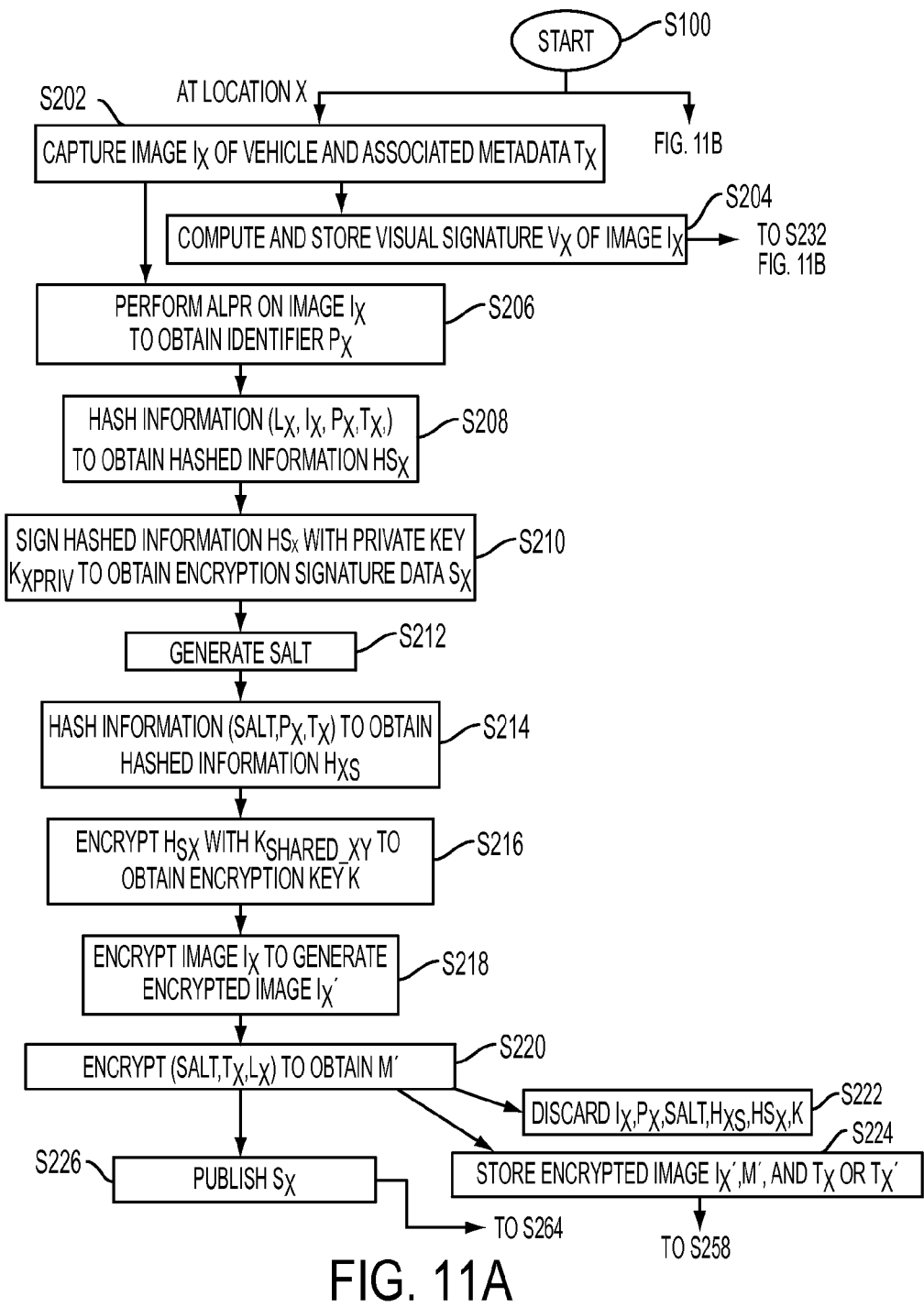
FIG. 11 (split into FIGS. 11A and 11B) is a flow chart illustrating the method for privacy-preserving identifier recognition of FIGS. 9 and 10.
Figure 11B:
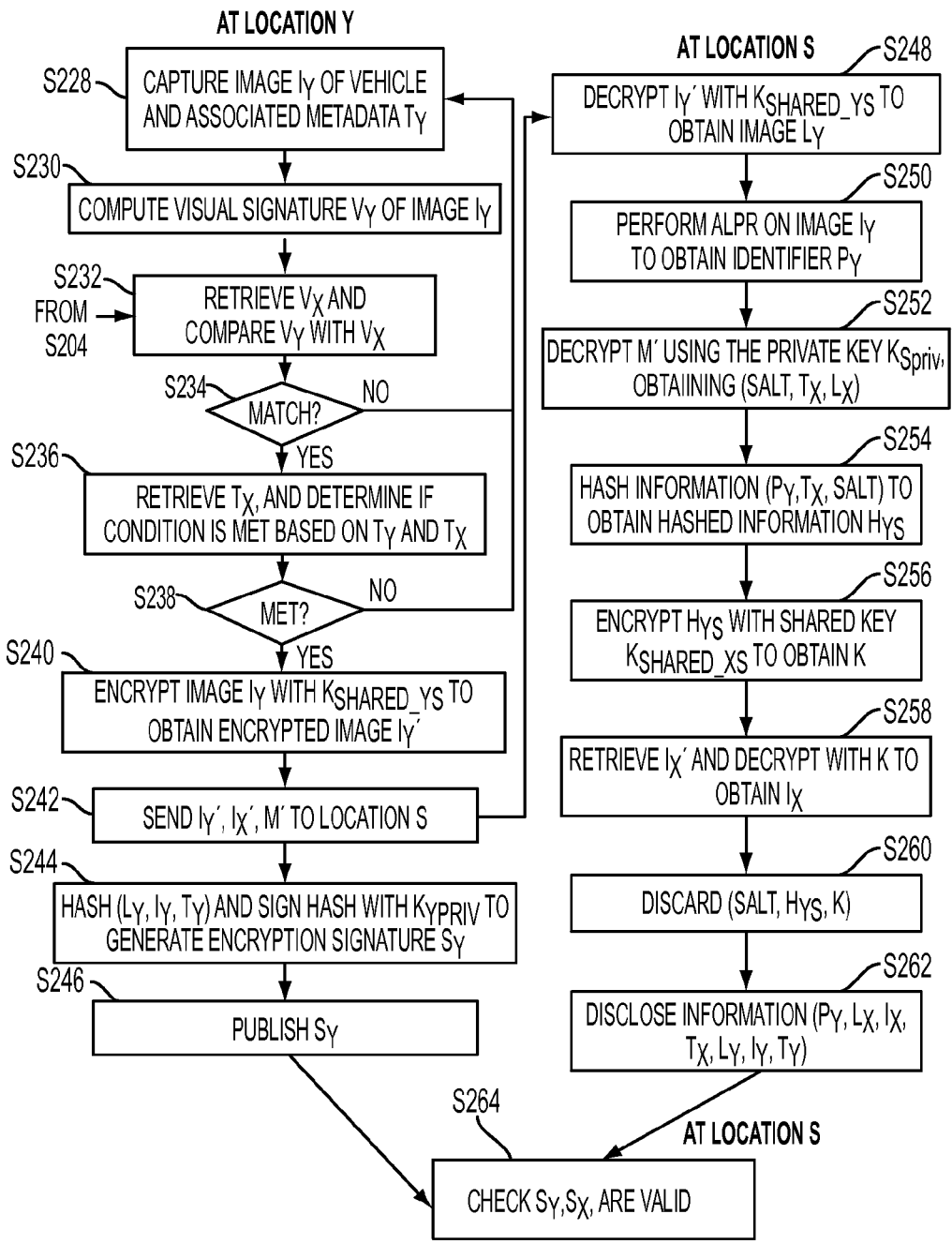

FIGS. 9 and 10 provide an overview of parts of the exemplary method in this embodiment. FIG. 11 provides a more detailed view of the method, which can be performed with the system of FIG. 8, analogously to the method of FIGS. 6A and 6B, except as noted. Instructions and information generated for performing the method can be stored in the memories 44, 46, 72, 222, in a similar manner to the instructions illustrated in FIGS. 2-4.

At location X, a first image 12 $I_X$ and associated metadata 30 $T_X$ are captured (S202) (e.g., by capture device 16, 26). A visual signature $V_X$ of image $I_X$ is generated (S204) (e.g., by signature computation component 90) and stored in memory and/or database 68, along with $T_X$ or $T_X'$ (and/or with a unique EventId).

Identifier recognition, such as ALPR is performed on image $I_X$, to obtain a license plate number $P_X$ (S206) (e.g., by identifier recognition component 94).

Some or all of the information ($L_X$, $I_X$, $P_X$, $T_X$) is hashed (e.g., by hashing component 98), using a one way hash function, to generate a hash $HS_X$ (S208). In the hash, $L_X$ is a value which uniquely identifies location X. For this purpose, $I_X$ can be the pixel values of the image, a predefined part thereof, or its visual signature. As will be appreciated, given a hash comprising three or more pieces of information together, it is very difficult to reconstruct the original information.

At S210, the hash $HS_X$ is signed with the private key for location X, $K_{Xpriv}$, obtaining encryption signature data $S_X$ (e.g., by encryption signature generation component 102).

At S212, a random number salt is generated (e.g., using a random number generator 240 (FIG. 2)). A key K is then generated, analogous to $K_X$ discussed above, but here based on ($P_X$, $T_X$, salt) and a shared key, such as $K_{shared\_XS}$. This include hashing ($P_X$, $T_X$, salt), using a one way hash function, to generate a hash value $H_{XS}$ (S214) (e.g., by the hashing component 98), and key-hashing or encrypting $H_{XS}$ with a shared key, such as $K_{shared\_XS}$ (S216), to obtain a symmetric cryptographic key K (e.g., performed by the cryptographic key generation component 102).

At S218, $I_X$ is encrypted using a secure symmetric encryption function and K to obtain $I_X'$ (e.g., by component 108).

At S220, information (Salt, $T_X$, $L_X$) may be encrypted using $K_{pub}$ to obtain M' (e.g., by component 242).

At S222, ($I_X$, $P_X$, salt, $H_{XS}$, $HS_X$, K) are discarded.

As additional metadata, the values ($I_X'$, M') may be stored in association with Tx (or Tx') and visual signature $V_X$ with the same EventId in memory or in database 68 (S224). $S_X$ may be disclosed, e.g., to the vehicle owner, the authorities, or another third party (S226).

Steps S202-S226 may be performed by the computer system at location X, or partly manually, under the control of the service operator at location X.

At location Y, the following may be performed:

At S228, a new (second) image $I_Y$ of a vehicle is acquired, as well as metadata, such as a time $T_Y$ at which the image $I_Y$ is captured (e.g., by capture device 18, 28).

At S230, a visual signature $V_Y$ of image $I_Y$ is computed (e.g., by component 120).

At S232, visual signature matching is performed in which $V_Y$ is compared with one or more signatures $V_X$, received from location X to determine whether there is a match (thereby establishing a link between the second image $I_Y$ and the first image $I_X$) (e.g., by component 144).

At S234, if a match is found, the method proceeds to S236, otherwise the method returns to S228 or ends.

At S236, if there is a match, $T_X$ is retrieved and a determination is made as to whether a condition is met based on the metadata $T_X$ and $T_Y$ (e.g., by component 146). This step may be performed at location Y or at the central location, e.g., if $T_X$ has been encrypted to form $T_X'$ with the public key $K_{Spub}$ of location S (for example, where location Y does not have the corresponding private key $K_{Xpriv}$ for decrypting it).

At S238, if the condition is met, the method proceeds to S240, otherwise the method returns to S228 or ends.

At S240, if there is a match and the condition is met, image $I_Y$ is encrypted using a symmetric encryption function and $K_{shared\_YS}$ 192, to obtain $I_Y'$ (e.g., by an image encryption component 250, FIG. 3).

At S242, encrypted image $I_Y'$, together with M', $I_X'$, retrieved from database 68, are sent to the central operator.

Optionally, at S244, some or all of ($L_Y$, $I_Y$, $T_Y$) can be hashed (e.g., by hashing component 128), to generate a hash $HS_Y$ and the hash signed using the location Y private key $K_{Ypriv}$ to obtain a cryptographic signature $S_Y$, which can then be disclosed (S246). Here, $L_Y$ is an identifier for location Y. $I_Y$ can be the image itself or the signature $V_Y$.

Steps S230-S246 may be performed using the computer system 42 at location Y, or partly manually by the operator.

At the central location S (or at location Y), the following may be performed:

At S248, encrypted image $I_Y'$ is decrypted using symmetric key $K_{shared\_YS}$ 190.

At S250, identifier recognition (e.g., ALPR) is performed on image $I_Y$, obtaining an identifier $P_Y$, such as a license plate number (e.g., by an identifier recognition component analogous to component 124, FIG. 3).

At S252, M' is decrypted using the private key $K_{Spriv}$, obtaining (salt, $T_X$, $L_X$).

A key K is generated, based on ($P_Y$, $T_X$, salt) and $K_{shared\_XS}$. This may include hashing ($P_Y$, $T_X$, salt) to generate $H_{YS}$ (S254) (which should be the same as $H_{XS}$, if performed correctly), and encrypting or key-hashing $H_{YS}$ using a shared key $K_{shared\_XS}$ to obtain K (S256).

At S258, encrypted image $I_X'$ can be decrypted using the symmetric key K, to obtain image $I_X$ (e.g., by an image decryption component analogous to component 138, FIG. 3).

The information (salt, $H_{YS}$, K) can be discarded (S260).

At S262, some or all of the following information ($P_Y$, $L_X$, $I_X$, $T_X$, $L_Y$, $I_Y$, $T_Y$ $I_X'$) can be provided to a third party, such as the validating authority or to the car owner, for example, in a secure way. Steps S250-S262 may be performed using the computer system 220 at location S, or partly manually by the central location operator.

If the evidence is challenged, at S264, the validation authority at Z can check the previously disclosed cryptographic signature $S_X$ is valid, using $K_{Xpub}$ and the value of hash ($L_X$, $I_X$, $P_Y$, $T_X$) since the hash function can be public. A similar validation can be performed for $S_Y$ with ($L_Y$, $I_Y$, $T_Y$). The validation authority can also check that the condition was met, based on $T_X$ and $T_Y$, that the encrypted first image Ix' was generated from the first image $I_X$ using K (after reconstructing K), and that K was generated from the first identifier information $P_X=P_Y$ and the metadata $T_X$ (and optionally $L_X$), by hashing this information using the hashing function that was used at both X and Y, which can be made public.

The embodiment illustrated in FIGS. 9-11 has several advantages over that of FIGS. 5-6. For example, there is no need for distributing private keys to remote locations and increased security may be achieved when generating the symmetric cryptographic key K by introducing randomness in the form of the salt. Additionally, key K is never disclosed.

In summary, the exemplary method illustrated in FIGS. 5-6 and 9-11 may include:

1. Encrypting an initial (first) image $I_X$ with symmetric cryptographic key $K_X$ (or K) that is based on information $P_X$ extracted from the image and associated metadata $T_X$, to generate an encrypted image $I_X'$;

2. Optionally, publishing an encryption signature $S_X$ establishing the existence of the initial image $I_X$, extracted information $P_X$ and metadata $T_X$;

3. Discarding the initial image $I_X$, the extracted information $P_X$, and the encryption key $K_X$ (or K), while keeping the encrypted image $I_X'$, and an optionally encrypted version of the metadata $T_X$ or $T_X'$, in a form that prevents decryption of the encrypted image $I_X'$;

4. Establishing a link (match $V_X \approx V_Y$) between a new (second) image $I_Y$ and the initial image $I_X$ and retrieving the metadata $T_X$ associated with initial image $I_X$ (optionally, in an encrypted form $T_X'$);

5. Extracting (the same) information $P_Y$ from the second image $I_Y$, decrypting the metadata $T_X'$ (if encrypted) and reconstructing the symmetric cryptographic key $K_X$ that was used to encrypt the initial image $I_X$, allowing third party decryption of the encrypted image $I_X'$ to regenerate image $I_X$; and 6. Optionally, producing evidence $K_{Xpub}$, hash($L_X$, $I_X$, $P_Y$, $T_X$) that can be checked by the signature $S_X$ produced in step 2. $S_Y$ can be similarly used as evidence.

7. All these steps can be performed in a decentralized way without the need for exchanging private keys.

The exemplary system and method enable the service operator, e.g., for legal reasons, to provide proof that both the timestamp and the image at both locations are valid, while complying with regulations which require the protection of drivers' privacy. To preserve driver privacy, the evidence is only read when the condition is met, under the assumption that the driver trusts the service operator to process his data. Otherwise the evidence remains as an opaque piece of data.

The methods illustrated in FIGS. 5, 6, and 9-11 may be implemented in computer program products that may be executed on a computer. The computer program products may each comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer on which it resides, (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 5-6 and 9-11, can be used to implement the method. As will be appreciated, while the steps of the method may all be computer implemented, in some embodiments one or more of the steps may be at least partially performed manually.

Further details of some of the steps of the exemplary methods will now be described.

Image and Metadata Capture (S102, S120, S202, S228)

Captured images 12, 14 ($I_X$ and $I_Y$) may be received by the system 10 in any convenient file format, such as JPEG, GIF, JBIG, BMP, TIFF, or the like or other common file format used for images and which may optionally be converted to another suitable format prior to processing. The input images may be stored in data memory during processing. The images may be individual images, such as photographs, or images extracted from sequences of images, such as video images. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The method is also suitable for black and white (monochrome) images. The word "color" is used to refer to any aspect of color which may be specified, including, but not limited to, absolute color values, such as hue, chroma, and lightness, and relative color values, such as differences in hue, chroma, and lightness. In some embodiments, color (i.e., pixel value) can refer to a non-visible region of the electromagnetic spectrum, such as the Near Infrared (NIR) region, which is from about 800 nm to 2500 nm.

The image capture at a given location X, Y may be triggered in any suitable manner. In one embodiment, a loop sensor may be locally positioned, e.g., in the ground, which detects the presence of a vehicle and triggers a shot (and possibly a flash). In one embodiment, the camera 16, 18 shoots a video comprising a sequence of images and a motion detection algorithm or an object detection algorithm (or the combination of both) is employed which detects the presence of a vehicle in the image sequence and selects one image from the sequence accordingly. Vehicle detection techniques are well known and disclosed for example, in U.S. Pat. Nos. 4,433,325, 5,083,200, 5,592,567, 5,809,161, 5,995,900, 6,996,255, and U.S. application Ser. Nos. 13/836, 310, and 13/973,330, the disclosures of all of which are incorporated herein in their entireties by reference. The image can be captured in full color, monochrome, NIR (near infrared), or a combination thereof.

In some embodiments, the same image capture device could be used for capturing both images $I_X$ and $I_Y$, such as in a car park.

The associated metadata 30, 32 may each include sufficient information to enable a determination to be made as to whether a predetermined condition has been met. One or more different types of information may be acquired, such as one or more of time stamp, current speed of the vehicle, GPS location, payment information, weather information, and the like.

Visual Signature Computation (S104, S122, S204, S230)

In the exemplary embodiment, the visual signature $V_X$, $V_Y$ contains enough information to identify a vehicle (or part of a vehicle) uniquely but should also robust enough to accommodate variations in viewpoint or lighting conditions. It is also constructed in such a way that, given a visual signature, neither the original image nor the identifier can be reconstructed from it.

In the exemplary embodiment, the visual signature $V_X$, $V_Y$ is extracted from a region of the image which is predicted to contain the identifier such as a region which encompasses the license plate or at least that part of it which includes the license plate number. To identify this region, a detection algorithm that extracts the corresponding part of the image can be run. Methods for identifying the region of interest in the larger image are described, for example, in U.S. Pub. No. 20130182909 and application Ser. No. 13/592,961, incorporated herein by reference.

Once the region of interest has been identified and a cropped image generated which includes this region, the visual signature $V_X$, $V_Y$ can be computed on the cropped region. In general, the visual signature is a statistical representation of the pixels of the cropped image. For example, a set of patches of the cropped image are extracted, e.g., densely, on a grid at one or at multiple scales. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire cropped image, or at least a part or a majority of the image. For example, at least 10 or at least 20 or at least 50 patches are extracted from each cropped image. Each patch may comprise at least 40 or at least 100 pixels, and up to 1,000,000 pixels or more.

For each patch, low-level features are extracted, such as shape, color and/or gradient (SIFT) features (see, D. Lowe, "Distinctive image features from scale-invariant keypoints", IJCV, 2004). A patch descriptor, such as a vector or histogram, which is a representation of the extracted low level features for a patch, is generated. Based on the descriptors of all the patches, on overall visual signature of the image is generated. In particular, statistics are computed on these patch descriptors and then the statistics are aggregated.

Each visual signature is a fixed-length vectorial representation of the (cropped) image in a D-dimensional space. In one embodiment, the visual signature is based on the Fisher Vector (FV). See, for example, Perronnin and Dance, "Fisher kernels on visual vocabularies for image categorization," CVPR, 2007; Perronnin, Sanchez and Mensink, "Improving the Fisher kernel for large-scale image classification", ECCV, 143-156 (2010); Sanchez and Perronnin, "High-dimensional signature compression for large-scale image classification," in CVPR 2011; U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al.; and U.S. Pub. No. 20120045134, published Feb. 23, 2012, entitled LARGE SCALE IMAGE CLASSIFICATION, by Florent Perronnin, et al. the disclosures of which are incorporated herein by reference in their entireties. The trained GMM is intended to describe the content of any image within a range of interest (for example, any license plate image if the range of interest is license plates). A Fisher Kernel representation can be generated by aggregation of the Fisher vectors. Other image representations may be used such as the bag-of-visual-words of Csurka et al., Visual Categorization with Bags of Keypoints, ECCV Workshop, 2004.

Fisher Vectors show robustness in the range of photometric and geometric variability found in license plate processing. Briefly, Fisher vectors work by aggregating local patch descriptors into a fixed-length representation. First, SIFT descriptors are extracted from patches extracted at multiple scales on a regular grid, and their dimensionality is optionally reduced using principal component analysis (PCA). A visual vocabulary is built by estimating a Gaussian mixture model (GMM) with patch descriptors extracted from a held-out set of images. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, it is assumed that there exists an underlying generative model, such as a Gaussian Mixture Model (GMM), from which all the local descriptors are emitted. Each patch can thus be characterized by a vector of weights, one weight for each of a set of (e.g., at least 5 or 10) Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., features of characters, such as straight lines, curved lines, etc.), characteristic background (e.g., light or dark surface, etc.), or the like. Given an image to be assigned a visual signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the visual signature or input to a generative model which outputs a visual signature based thereon.

The Fisher vector is computed as the derivative of the log-likelihood with respect to the GMM parameters. For example, if only the means are considered, it can be shown that the expression is given by:

$$f_{id} = \gamma(X_t)\left[\frac{x_{t,d} - m_{i,d}}{(S_{i,d})^2}\right]$$

where $\gamma(x_t)$ is the soft-assignment probability of the tth patch to the ith Gaussian, $x_{t,d}$ is the dth component of the ith patch, and $m_{i,d}$ and $S_{i,d}$ are the dth components of the mean and standard deviations of the ith Gaussian, assuming diagonal covariances. Here, $i=1$ K and $d=1 \ldots D$. If only the derivatives with respect to the mean are used, then the resulting Fisher vector is a concatenation of the K×D elements $f_{i,d}$. Square-rooting and $l_2$-normalization of the vector may be used.

To include spatial information about the cropped image, the image can be partitioned into regions, such as at least three regions, the per-patch statistics aggregated at a region level, and then the region-level representations concatenated to form the image representation. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

The exemplary visual signatures are of a fixed dimensionality D, i.e., each image representation has the same number of elements. In general, each image representation has at least 30, or at least 60, or at least 100, or at least 500 dimensions, and up to 1000 or more dimensions, each dimension having a respective feature value, which may be reduced to fewer dimensions.

As an example, the low-level features include gradient features, such as SIFT descriptors, one per patch. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales. The dimensionality of these descriptors can be reduced from 128 to 32 dimensions. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. In the examples below, a visual vocabulary of 64 Gaussians is used in the GMM and only the gradient with respect to the mean parameters is considered. The cropped image is split into 4 regions (4 vertical stripes). This results in a 32×64×4=8, 192-dimensional FV representation. The representations may be indexed or compressed using conventional techniques (locality sensitive hashing (LSH), product quantization, principal component analysis (PCA), etc.) to speed up the process.

The visual signature is one which does not allow recognition from the identifier from it. A visual signature such as the FV fulfills the desired property that the original image cannot be reconstructed for it, and therefore can be seen as a hash key of the original image as there is no feasible way to recover the original image (or the license plate number) from the visual signature. This is because the identity of the individual patches is lost in the aggregation process. Consequently, this reduces the privacy concern as the service operator does not have access to the identities of all vehicles, only a very small portion of the vehicles that cause the actions to be triggered (e.g., vehicles driving above speed limit). Like hashing functions used for storing passwords, the only method to recover the original image is to try to perform a brute-force match with all possible images.

Other exemplary methods for computing image representations are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831;

20110040711; 20110052063; 20110072012; 20110091105; 20110137898; 20110184950; 20120045134; 20120076401; 20120143853, and 20120158739.

Storage (S114, S224)

The signature/metadata pair ($V_X$, $T_X$ or $T_X'$) is stored in the database 64 linked together so that the signature matching component 144 can return the associated metadata whenever it finds a match between a signature $V_X$ and the visual signature $V_Y$ of a new image $I_Y$.

Visual Search (S124, S232)

Given a query visual signature $V_Y$, the database 64 is searched for its closest match(es). The measure of similarity which is used may depend on the type of visual signature employed. The cosine distance has been shown to be an appropriate measure of similarity for the FV. However, other similarity measures are also contemplated, such as the Euclidian distance and the Manhattan distance. The Euclidian distance, dot product, the $chi^2$ distance, Kullback-Leibler (KL) divergence, Jensen-Shannon divergence, and the like may be used in computing similarity for other types of visual signature, for example in the bag-of visual words method.

When the number of visual signatures $V_X$ stored in the database 64 is small enough (e.g., on the order of several thousand visual signatures), then the search for a closest match V* can be done in an exhaustive manner, i.e., by comparing the visual query with all database entries. When the database 64 contains a larger number of images, an exhaustive search may be time consuming. In this case, an approximate search technique may be employed. Techniques for the approximate search of high-dimensional vectors are disclosed, for example, in Jégou, et al., "Aggregating local image descriptors into compact codes," IEEE TPAMI, 34(9)1704-1716 (2012).

Since the Fisher vector is an explicit embedding of the Fisher kernel, the corresponding cosine similarity measure between two such image descriptors $V_X$ and $V_Y$ is the dot product $V_X^T V_Y$. A candidate plate is compared against all images in a database and the identity of the closest match is assigned, provided the similarity is sufficiently high.

In one embodiment, the visual signature (e.g., the FV) can be made more discriminative by applying a projection which is obtained, for instance, by learning a metric for embedding the visual signature into a vectorial space where similarity is a good indicator for actual similarity (in terms of the character sequences forming the identifiers). As an example, a low-rank Mahalanobis metric can be employed, see for example, Rodriguez-Serrano, et al., "Data-Driven Vehicle Identification by Image Matching". $12^{th}$ European Conf. on Computer Vision (ECCV) Workshops, Oct. 7-13, 2012, Lecture Notes in Computer Science, vol. 7584, pp. 536-545. See also U.S. application Ser. Nos. 13/592,961, 13/757,014, and Ser. No. 13/903,218, the disclosures of which are incorporated by reference, for descriptions of exemplary embedding techniques. The FV has been shown experimentally to be particularly appropriate for matching of license plate images, especially in combination with learned projections. The Fisher Vector is also shown below to be superior to the standard license plate matching approach which involves in performing ALPR and then comparing the sequences.

Metadata Processing (S128, S236)

The condition computation component 146 may compute various metrics based on the metadata collected at two (or more) locations. For example, the timestamps and GPS coordinates may be used to infer an average speed. This may be compared with a threshold speed, e.g., a maximum speed limit, to determine whether the speed limit is exceeded. In the case of information relating to weather conditions (e.g., a detected rainfall or visibility), this may be used to determine whether the average speed of the vehicle exceeded a weather-related speed limit, which may be lower than the normal posted speed limit.

In some applications images captured at "entries" are associated to "tickets". Thus the metadata can include a ticket ID, ticket status (paid, non-paid), paid amount, authorized time (e.g., based on the paid amount), and so forth. For example, if a ticket was paid for authorizing the user to park for a time of 2 hours, but the user parked for 4 hours, an unpaid amount may be computed optionally with a penalty. In this case, the test condition applied at S124 may define a relationship between the computed time and the authorized time, for example, to allow for some leeway. For example, the condition may specify that the test is met if the computed time exceeds the authorized time by at least a predetermined amount, such as 5, 10 or 15 minutes, or a percentage of the authorized time.

As will be appreciated, the test may include more than one condition and a given test may require that one or more (or all) of the conditions be satisfied for the test to be met. In some cases, conditions may be evaluated in the alternative. For example, one condition may specify: if condition 1 is satisfied, test condition 2, otherwise test condition 3. Different conditions may rely on the same or different parts of the metadata. For example, one condition could relate to the weather or time of day/day of the week, and another condition to the computed speed of the vehicle, length of stay in the car park, and so forth.

ALPR (S106, S132, S206, S250)

Identifier recognition, such as ALPR, may be performed at the first location X at any time after capture of the image and prior to its encryption. In one embodiment, only if the test performed on the metadata at S128, S236 is positive (e.g., speed greater than a posted speed limit, a parking duration which does not correspond to a paid amount, exiting a car park without paying ticket), then identifier recognition, e.g., ALPR is performed. ALPR may be performed in this case at the second location Y or at a central location S. The ALPR may be performed on image $I_X$, $I_Y$ before or after cropping or other processing. For example, any suitable ALPR system may be used for recognizing the license plate number in the cropped image. Where multiple images $I_X$, $I_Y$ are obtained at location X or Y, as in a video sequence, these are considered to be the same as image $I_X$ or $I_Y$, respectively.

In the case of license plate number recognition, the vehicle identifier (sometimes referred to as a registration or license plate number) includes a sequence of characters drawn from a predefined alphabet (a finite set of characters), such as letters and numbers. The license plate number may be a numeric or alphanumeric code that uniquely identifies the vehicle on which it is mounted within the issuing region's database.

The license plate recognition component 94, 124 may use optical character recognition (OCR) alone or in combination with other techniques, to identify a sequence of characters drawn from the finite alphabet that is predicted to correspond to the characters in the cropped (or original) image $I_X$, $I_Y$. Spaces and characters other than those in the finite alphabet may be ignored. In some embodiments, the recognition component 94, 124 may extract additional textual information, such as the state of issuance. Logos may also be recognized from a stored logo database.

As will be appreciated, the license plate number and image of a license plate are exemplary only and are used to illustrate the exemplary embodiment. In other embodiments, a larger set of ASCII, UNICODE, and/or UTF-8 characters may be used as the alphabet. License plate recognition methods which may be used are disclosed, for example, in above-mentioned U.S. Pub. Nos. 20130129151, 20130129152, 20130182909, and 20130259314, and U.S. application Ser. Nos. 13/592,961, 13/757,014, 13/836,310, and 13/903,218, and in J-A. Rodriguez-Serrano, H Sandhawalia, R. Bala, F. Perronnin and C. Saunders, "Data-Driven Vehicle Identification by Image Matching". $12^{th}$ European Conf. on Computer Vision (ECCV) Workshops, Oct. 7-13, 2012, Lecture Notes in Computer Science, vol. 7584, pp. 536-545. In one embodiment, Xerox License Plate Recognition (XLPR) software is employed.

Action (S144)

The action initiated by the system may depend on the type of application. In the case of license plates, the action triggered is associated to the respective license plate number identified (e.g., prosecute the violator, alert parking operator, send parking fine, etc.).

Accounting for Imperfect Matching

In some embodiments, it is reasonable to assume that the visual signature matching component 144 delivers 100% accuracy. In such a case, the following operations may be performed:

1. At location X, all the images captured at location X can be discarded after signature computation.

2. At location Y, all the images and signatures of non-violating vehicles can be discarded after S142.

However, a 100% accuracy is not always possible in practice. For example, the following sources of failure may be found. First, the visual signature matching component 144 sometimes does not return any result, for example, because the confidence in the closest match is too low. In such a case, steps S134, etc., are simply not performed. This also means that the corresponding signature which should have been retrieved as V* remains in the database, possibly indefinitely. To avoid the database becoming populated with signatures which may never be needed again, the database may be regularly purged to remove its oldest entries, for example, when they have been in the system for more than a predetermined amount of time. In the case where the condition tested at S128 cannot be met after a predetermined amount of time (for example, the computed speed can no longer exceed the speed limit) the signatures $V_X$ which cannot meet the specified condition can be purged.

A second source of failure is a false positive, where the signature matching component 144 may return an incorrect result with a confidence which is higher than a predetermined confidence threshold. This may lead to a vehicle owner erroneously receiving a parking/speeding ticket or other action being taken. In such a case, it may be desirable to ensure that a human operator can correct such an error, when the error becomes known. For example, a procedure may be established for the driver of the vehicle, service provider, or law enforcement to challenge the system. To assist in verifying that a failure has occurred, the encrypted image $I_X'$ may be stored in the database or delivered to the verifying authority in the evidence package. Both $I_X$ and $I_Y$ may be included in the evidence package output at S142. Only the persons who are authorized to access the evidence package (e.g., officers of the law) may have access to the private key needed to decrypt the images.

Uses of the Exemplary System

Examples of where the exemplary system and method may find application include:

1. Point-to-point enforcement, for example speed enforcement on a medium-/long-range.

2. Monitoring entries and exits of car parks. When a vehicle exits the car park, the signature matching component associates its visual signature with the entry transaction. Assuming a ticket is delivered to the customer at the entry, the metadata can include the timestamp, the ticket number, and payment status for that ticket. At the exit, the metadata processing at S128 checks that the ticket has been paid and that the paid amount corresponds to the correct duration. It is also possible to ascertain if the ticket is associated with the same car at entry and exit to avoid ticket swapping. In car parks with barriers, that could trigger an alert to an operator to go and resolve the issue. In car parks without barriers, a fine could be sent to a customer.

In the case of ticket-less parking, when a vehicle exits the car park, the signature matching component associates its visual signature with the entry transaction. When paying the parking fees, the user can associate the visual signature with an information such as license plate number. The metadata can include the timestamp and payment status for that license plate number. At the exit, the metadata processing at S128 checks that the paid amount for the license plate number corresponds to the correct duration. In car parks with barriers, that could trigger an alert to an operator to go and resolve the issue. In car parks without barriers, a fine could be sent to a customer.

3. Automatic tolling: this may include associating the vehicle ID with the bank account/credit card of subscribed drivers for automatic payments.

4. Violation enforcement: this may include associate the violating vehicle ID with the identity of the vehicle owner for prosecution.

5. Car park management: this may include associating the vehicle ID with an issued parking ticket and open a barrier automatically at the car park exit; or associate the vehicle ID to a subscribed customer account and open all barriers automatically.

6. Vehicle flow analysis/data mining: This may include tracking re-occurring vehicle IDs to measure travel times, analyze patterns of behavior, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for preserving privacy of evidence comprising:

receiving an encrypted first image which has been generated by encrypting a first image with a symmetric cryptographic key that is generated by encrypting, with a one way function, first information extracted from the first image and first metadata associated with the first image and signing the encrypted first information and first metadata with a shared key, wherein the first metadata comprises a first time;

establishing a link between a second image and the first image comprising comparing a first visual signature computed based on the first image with a second visual signature computed based on the second image, each of the first and second visual signatures being a statistical representation of pixels of the respective image;

when the visual signatures are found to match, receiving the first metadata;

extracting second information from the second image;

reconstructing the symmetric cryptographic key that was used to encrypt the first image based on the second information extracted from the second image and the first metadata, by encrypting, with the one way function, the second information and the first metadata and signing the encrypted second information and first metadata with the shared key, the reconstructed symmetric cryptographic key permitting the first encrypted image to be decrypted to regenerate the first image, wherein at least one of the establishing a link between a second image and the first image and the reconstructing of the symmetric cryptographic key is performed with a processor.

2. The method of claim 1, further comprising determining whether a condition is met based on the metadata associated with the first image and metadata assocated with the second image.

3. The method of claim 2, wherein the reconstructing of the symmetric cryptographic key is performed only when the condition is met.

4. The method of claim 1, wherein the information extracted from the first image comprises a first identifier and the information extracted from the second image comprises a second identifier, the reconstructing of the symmetric cryptographic key establishing that the first identifier matches the second identifier.

5. The method of claim 1, wherein the reconstruction of the symmetric cryptographic key comprises hashing the first metadata and the second information.

6. The method of claim 5, further comprising encrypting the hashed first metadata and second information with a shared key.

7. The method of claim 1, further comprising generating the shared key at a first location and at a second location and wherein the symmetric cryptographic key is generated at the first location with the shared private key and the reconstruction of the symmetric cryptographic key is performed at the second location with the shared key.

8. The method of claim 7, wherein the shared key is generated by exchanging a public key of each of first and second key pairs and combining each of the public keys with a private key of the other of the key pairs.

9. The method of claim 1, wherein the first image and symmetric cryptographic key are generated at a first location and the reconstruction is performed at a second location, and wherein the first image and the symmetric cryptographic key generated at the first location are not made available to the second location.

10. The method of claim 1, further comprising outputting an evidence package which includes at least one of:
the first image;
the second image;
the first information;
the second information;
the first metadata;
second metadata associated with the second image, the second metadata comprising a second time, later than the first time; and
a signature produced by hashing at least two of:
the first image,
the first information,
the first metadata, and
a first location identifier identifying a location at which the first image was captured.

11. The method of claim 1, further comprising publishing an encryption signature establishing the existence of the first image, extracted first information, and first metadata.

12. The method of claim 1, wherein the second image is associated with second metadata which comprises a second time, later than the first time.

13. A system comprising:
memory which receives:
an encrypted first image which has been generated by encrypting
a first image with a symmetric cryptographic key that is generated by encrypting, with a one way function, first identifier information extracted from the first image and first metadata associated with the first image and signing the encrypted first information and first metadata with a shared key,
the first metadata, and
a first visual signature which has been extracted from the first image, the first visual signature being a statistical representation of pixels of the first image;
a signature matching component which compares the first visual signature with a second visual signature extracted from a second image to establish a link between the second image and the first image, the second visual signature being a statistical representation of pixels of the second image;
an identifier recognition component which extracts second identifier information from the second image;
a cryptographic key reconstruction component for reconstructing the symmetric cryptographic key that was used to encrypt the first image based on the second identifier information extracted from the second image and the first metadata, by encrypting, with the one way function, the second information and the first metadata and signing the encrypted second information and first metadata with the shared key, the reconstructed symmetric cryptographic key permitting the first encrypted image to be decrypted to regenerate the first image; and
at least one processor which implements the signature matching component,
identifier recognition component, and cryptographic key reconstruction component.

14. The system of claim 13, further comprising a condition computation component which determines whether a condition is met based on the metadata associated with the first image and metadata associated with the second image.

15. The system of claim 13, further comprising a first computer system, at a first location, which generates the symmetric cryptographic key and encrypted first image, and a second computer system at a second location, which includes the cryptographic key reconstruction component.

16. The method of claim 1, wherein the first image is an image captured of a vehicle at a first time and wherein the second image is an image captured of a vehicle at a second time.

17. A computer program product comprising a non-transitory memory storing instructions, which when implemented by a computer processor, perform a method for preserving privacy of evidence comprising:
receiving an encrypted first image which has been generated by encrypting a first image with a symmetric cryptographic key that is generated by encrypting, with a one way function, first information extracted from the first image and first metadata associated with the first image and signing the encrypted first information and first metadata with a shared key, wherein the first metadata comprises a first time;
establishing a link between a second image and the first image comprising comparing a first visual signature computed based on the first image with a second visual signature computed based on the second image, each of the first and second visual signatures being a statistical representation of pixels of the respective image;

when the visual signatures are found to match, receiving the first metadata;

extracting second information from the second image; and reconstructing the symmetric cryptographic key that was used to encrypt the first image based on the second information extracted from the second image and the first metadata, by encrypting, with the one way function, the second information and the first metadata and signing the encrypted second information and first metadata with the shared key, the reconstructed symmetric cryptographic key permitting the first encrypted image to be decrypted to regenerate the first image.

* * * * *